(12) United States Patent
Barbieri et al.

(10) Patent No.: US 10,320,550 B2
(45) Date of Patent: Jun. 11, 2019

(54) CQI ESTIMATION IN A WIRELESS COMMUNICATION NETWORK

(71) Applicant: QUALCOMM Incorporated, San Diego, CA (US)

(72) Inventors: Alan Barbieri, San Diego, CA (US); Parag Arun Agashe, San Diego, CA (US); Aleksandar Damnjanovic, Del Mar, CA (US); Tingfang Ji, San Diego, CA (US); Tao Luo, San Diego, CA (US); Madhavan Srinivasan Vajapeyam, San Diego, CA (US); Yongbin Wei, San Diego, CA (US); Hao Xu, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 840 days.

(21) Appl. No.: 14/456,916

(22) Filed: Aug. 11, 2014

(65) Prior Publication Data
US 2014/0348019 A1 Nov. 27, 2014

Related U.S. Application Data

(62) Division of application No. 13/084,154, filed on Apr. 11, 2011.
(Continued)

(51) Int. Cl.
*H04L 5/00* (2006.01)
*H04L 1/00* (2006.01)
(Continued)

(52) U.S. Cl.
CPC .......... *H04L 5/0057* (2013.01); *H04L 1/0026* (2013.01); *H04L 1/0028* (2013.01);
(Continued)

(58) Field of Classification Search
None
See application file for complete search history.

(56) References Cited

U.S. PATENT DOCUMENTS

| | | | |
|---|---|---|---|
| 5,936,979 | A | 8/1999 | Jyrkkae |
| 6,574,456 | B2 | 6/2003 | Hamabe |

(Continued)

FOREIGN PATENT DOCUMENTS

| | | | |
|---|---|---|---|
| CN | 1438781 A | 8/2003 |
| CN | 1438781 A | 8/2003 |

(Continued)

OTHER PUBLICATIONS

"3rd Generation Partnership Project; Technical Specification Group Radio Access Network; Evolved Universal Terrestrial Radio Access (E-UTRA) ; Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010 (Sep. 17, 2010), pp. 1-80, XP050442094, [retrieved on Sep. 17, 2010].

(Continued)

*Primary Examiner* — Jamaal Henson
(74) *Attorney, Agent, or Firm* — Patterson & Sheridan, LLP

(57) ABSTRACT

Techniques for estimating and reporting channel quality indicator (CQI) are disclosed. Neighboring base stations may cause strong interference to one another and may be allocated different resources, e.g., different subframes. A UE may observe different levels of interference on different resources. In an aspect, the UE may determine a CQI for resources allocated to a base station and having reduced or no interference from at least one interfering base station. In another aspect, the UE may determine multiple CQI for resources of different types and associated with different interference levels. For example, the UE may determine a (Continued)

first CQI based on at least one first subframe allocated to the base station and having reduced or no interference from the interfering base station(s). The UE may determine a second CQI based on at least one second subframe allocated to the interfering base station(s).

41 Claims, 10 Drawing Sheets

Related U.S. Application Data

(60) Provisional application No. 61/323,822, filed on Apr. 13, 2010, provisional application No. 61/323,770, filed on Apr. 13, 2010.

(51) Int. Cl.
   H04W 24/08 (2009.01)
   H04W 24/00 (2009.01)
   H04W 28/16 (2009.01)

(52) U.S. Cl.
   CPC ............ H04W 24/08 (2013.01); H04W 24/00 (2013.01); H04W 28/16 (2013.01); Y02D 70/1222 (2018.01); Y02D 70/1242 (2018.01); Y02D 70/1262 (2018.01); Y02D 70/1264 (2018.01); Y02D 70/142 (2018.01); Y02D 70/146 (2018.01); Y02D 70/23 (2018.01)

(56) References Cited

U.S. PATENT DOCUMENTS

| | | |
|---|---|---|
| 6,839,333 B1 | 1/2005 | Åkerberg |
| 6,907,270 B1 | 6/2005 | Blanz |
| 6,973,098 B1 | 12/2005 | Lundby et al. |
| 7,031,753 B2 | 4/2006 | Hashem et al. |
| 7,184,497 B2 | 2/2007 | Jeske et al. |
| 7,206,598 B2 | 4/2007 | Attar et al. |
| 7,283,510 B2 | 10/2007 | Ito et al. |
| 7,428,269 B2 | 9/2008 | Sampath et al. |
| 7,738,907 B2 | 6/2010 | Xiao et al. |
| 7,742,444 B2 | 6/2010 | Mese et al. |
| 7,813,311 B2 | 10/2010 | Dick et al. |
| 7,852,744 B2 | 12/2010 | Palanki |
| 7,860,198 B2 | 12/2010 | Montalbano |
| 7,881,339 B2 | 2/2011 | Smee et al. |
| 7,907,572 B2 | 3/2011 | Yang et al. |
| 7,944,983 B2 | 5/2011 | Fu et al. |
| 8,068,785 B2 | 11/2011 | Ahn et al. |
| 8,073,481 B2 | 12/2011 | Luo et al. |
| 8,085,875 B2 | 12/2011 | Gore et al. |
| 8,102,935 B2 | 1/2012 | Akkarakaran et al. |
| 8,107,885 B2 | 1/2012 | Love et al. |
| 8,121,602 B2 | 2/2012 | Yi et al. |
| 8,130,849 B2 | 3/2012 | Lincoln et al. |
| 8,229,036 B2 | 7/2012 | Kolze |
| 8,254,911 B1 | 8/2012 | Lee |
| 8,270,547 B2 | 9/2012 | Panicker et al. |
| 8,275,408 B2 | 9/2012 | Attar et al. |
| 8,305,921 B2 | 11/2012 | Narasimhan et al. |
| 8,306,165 B2 | 11/2012 | Huang et al. |
| 8,385,477 B2 | 2/2013 | Cedergren et al. |
| 8,411,780 B2 | 4/2013 | Jonsson et al. |
| 8,477,603 B2 | 7/2013 | Sambhwani et al. |
| 8,493,942 B2 | 7/2013 | Luo et al. |
| 8,605,771 B2 | 12/2013 | Cairns |
| 8,611,295 B2 | 12/2013 | Song et al. |
| 8,654,701 B2 | 2/2014 | Kazmi et al. |
| 2001/0007819 A1 | 7/2001 | Kubota |
| 2002/0188723 A1 | 12/2002 | Choi et al. |
| 2003/0016740 A1 | 1/2003 | Jeske et al. |
| 2003/0125040 A1 | 7/2003 | Walton et al. |
| 2004/0072579 A1 | 4/2004 | Hottinen |
| 2004/0166887 A1* | 8/2004 | Laroia ................. H04B 7/0491 455/522 |
| 2006/0121946 A1 | 6/2006 | Walton et al. |
| 2007/0036066 A1 | 2/2007 | Thomas et al. |
| 2007/0036179 A1 | 2/2007 | Palanki et al. |
| 2007/0064655 A1 | 3/2007 | Ruuska |
| 2007/0081480 A1 | 4/2007 | Cai et al. |
| 2007/0082619 A1* | 4/2007 | Zhang ................. H04W 52/143 455/69 |
| 2007/0098098 A1 | 5/2007 | Xiao et al. |
| 2007/0109989 A1 | 5/2007 | Nakagawa et al. |
| 2007/0191015 A1 | 8/2007 | Hwang et al. |
| 2007/0197251 A1 | 8/2007 | Das et al. |
| 2007/0232238 A1 | 10/2007 | Kawasaki |
| 2007/0293234 A1 | 12/2007 | Kim et al. |
| 2008/0014958 A1 | 1/2008 | Kim et al. |
| 2008/0049813 A1* | 2/2008 | Kurose ................. H04L 1/0016 375/141 |
| 2008/0051087 A1 | 2/2008 | Ryu et al. |
| 2008/0123547 A1 | 5/2008 | Palanki |
| 2008/0233967 A1 | 9/2008 | Montojo et al. |
| 2008/0261645 A1 | 10/2008 | Luo et al. |
| 2008/0285477 A1* | 11/2008 | Kuroda ................. H04L 1/0026 370/252 |
| 2009/0135754 A1 | 5/2009 | Yavuz et al. |
| 2009/0161781 A1 | 6/2009 | Kolze |
| 2009/0168718 A1* | 7/2009 | Wang ................. H04L 1/0026 370/330 |
| 2009/0170442 A1 | 7/2009 | Asanuma et al. |
| 2009/0199055 A1 | 8/2009 | Chen et al. |
| 2009/0201825 A1 | 8/2009 | Shen et al. |
| 2009/0238256 A1 | 9/2009 | Onggosanusi et al. |
| 2009/0247181 A1 | 10/2009 | Palanki et al. |
| 2009/0252077 A1 | 10/2009 | Khandekar et al. |
| 2009/0257390 A1 | 10/2009 | Ji et al. |
| 2009/0264142 A1 | 10/2009 | Sankar et al. |
| 2009/0316809 A1 | 12/2009 | Chun et al. |
| 2009/0323616 A1 | 12/2009 | Zeller et al. |
| 2010/0002608 A1 | 1/2010 | Goldhamer |
| 2010/0002664 A1 | 1/2010 | Pan et al. |
| 2010/0008282 A1 | 1/2010 | Bhattad et al. |
| 2010/0008317 A1* | 1/2010 | Bhattad ................. H04L 1/0003 370/329 |
| 2010/0035555 A1 | 2/2010 | Bala et al. |
| 2010/0039970 A1 | 2/2010 | Papasakellariou et al. |
| 2010/0041390 A1 | 2/2010 | Chen et al. |
| 2010/0048151 A1 | 2/2010 | Hara |
| 2010/0067366 A1 | 3/2010 | Nicoli et al. |
| 2010/0098012 A1 | 4/2010 | Bala et al. |
| 2010/0106828 A1 | 4/2010 | Palanki et al. |
| 2010/0111235 A1 | 5/2010 | Zeng et al. |
| 2010/0182903 A1 | 7/2010 | Palanki et al. |
| 2010/0195582 A1 | 8/2010 | Koskinen |
| 2010/0195604 A1 | 8/2010 | Papasakellariou et al. |
| 2010/0202308 A1* | 8/2010 | Gorokhov ............ H04B 7/0417 370/252 |
| 2010/0202311 A1 | 8/2010 | Lunttila et al. |
| 2010/0202372 A1 | 8/2010 | Chun et al. |
| 2010/0214937 A1 | 8/2010 | Chen et al. |
| 2010/0215075 A1 | 8/2010 | Jonsson et al. |
| 2010/0216405 A1 | 8/2010 | Bhadra et al. |
| 2010/0222062 A1 | 9/2010 | Chou et al. |
| 2010/0226327 A1 | 9/2010 | Zhang et al. |
| 2010/0227638 A1 | 9/2010 | Park et al. |
| 2010/0238884 A1* | 9/2010 | Borran ................. H04W 16/10 370/329 |
| 2010/0272077 A1 | 10/2010 | Van Rensburg et al. |
| 2010/0278109 A1 | 11/2010 | Papasakellariou et al. |
| 2010/0278290 A1 | 11/2010 | Huang et al. |
| 2011/0013710 A1 | 1/2011 | Xiao |
| 2011/0032839 A1 | 2/2011 | Chen et al. |
| 2011/0081917 A1 | 4/2011 | Frank et al. |
| 2011/0092231 A1 | 4/2011 | Yoo et al. |
| 2011/0105164 A1 | 5/2011 | Lim et al. |
| 2011/0105171 A1 | 5/2011 | Luschi et al. |
| 2011/0142003 A1 | 6/2011 | Kuchi et al. |
| 2011/0158211 A1 | 6/2011 | Gaal et al. |
| 2011/0170496 A1 | 7/2011 | Fong et al. |

(56) References Cited

U.S. PATENT DOCUMENTS

| | | | |
|---|---|---|---|
| 2011/0170514 | A1 | 7/2011 | Eriksson et al. |
| 2011/0177821 | A1 | 7/2011 | Senarath et al. |
| 2011/0206167 | A1 | 8/2011 | Rosenqvist et al. |
| 2011/0211503 | A1 | 9/2011 | Che et al. |
| 2011/0249643 | A1 | 10/2011 | Barbieri et al. |
| 2011/0250919 | A1 | 10/2011 | Barbieri et al. |
| 2011/0275394 | A1 | 11/2011 | Song et al. |
| 2011/0312319 | A1 | 12/2011 | Lindoff et al. |
| 2011/0312358 | A1 | 12/2011 | Barbieri et al. |
| 2011/0317624 | A1 | 12/2011 | Luo et al. |
| 2012/0003945 | A1 | 1/2012 | Liu et al. |
| 2012/0009959 | A1 | 1/2012 | Yamada et al. |
| 2012/0044818 | A1 | 2/2012 | Lindoff et al. |
| 2012/0063386 | A1 | 3/2012 | Park et al. |
| 2012/0076025 | A1 | 3/2012 | Barbieri et al. |
| 2012/0076040 | A1 | 3/2012 | Hoshino et al. |
| 2012/0082197 | A1 | 4/2012 | Jonsson et al. |
| 2012/0092989 | A1 | 4/2012 | Baldemair et al. |
| 2012/0113851 | A1 | 5/2012 | Schober et al. |
| 2012/0190391 | A1 | 7/2012 | Yoo et al. |
| 2012/0201152 | A1 | 8/2012 | Yoo et al. |
| 2012/0263247 | A1 | 10/2012 | Bhattad et al. |
| 2012/0327795 | A1 | 12/2012 | Mallik et al. |
| 2012/0329498 | A1 | 12/2012 | Koo et al. |
| 2013/0039203 | A1 | 2/2013 | Fong et al. |
| 2013/0157675 | A1 | 6/2013 | Li et al. |
| 2013/0301458 | A1 | 11/2013 | Barbieri et al. |

FOREIGN PATENT DOCUMENTS

| | | | |
|---|---|---|---|
| CN | 1708923 | A | 12/2005 |
| CN | 17089230 | A | 12/2005 |
| CN | 1943158 | A | 4/2007 |
| CN | 1943158 | A | 4/2007 |
| EP | 1337054 | A2 | 8/2003 |
| EP | 1337054 | A2 | 8/2003 |
| EP | 1533966 | A2 | 5/2005 |
| EP | 1735938 | A1 | 12/2006 |
| EP | 1735938 | A1 | 12/2006 |
| EP | 2001183 | A1 | 12/2008 |
| JP | H08181653 | A | 7/1996 |
| JP | 2003163960 | A | 6/2003 |
| JP | 2007189619 | A | 7/2007 |
| JP | 2007189619 | A | 7/2007 |
| JP | 3973017 | B2 | 9/2007 |
| JP | 3973017 | B2 | 9/2007 |
| JP | 2009188955 | A | 8/2009 |
| JP | 2010016494 | A | 1/2010 |
| JP | 2010016494 | A | 1/2010 |
| JP | 2013534778 | A | 9/2013 |
| JP | 2013534778 | A | 9/2013 |
| KR | 20080046404 | A | 5/2008 |
| KR | 20080046404 | A | 5/2008 |
| RU | 2211535 | C2 | 8/2003 |
| RU | 2351069 | C2 | 3/2009 |
| WO | 03041300 | A1 | 5/2003 |
| WO | WO-03041300 | A1 | 5/2003 |
| WO | 05013509 | | 2/2005 |
| WO | 2005089004 | A1 | 9/2005 |
| WO | WO-2005089004 | A1 | 9/2005 |
| WO | 2005099163 | A1 | 10/2005 |
| WO | WO-2005099163 | A1 | 10/2005 |
| WO | 2006020021 | A1 | 2/2006 |
| WO | WO-2006020021 | A1 | 2/2006 |
| WO | 2006041628 | A1 | 4/2006 |
| WO | WO-2006099546 | A1 | 9/2006 |
| WO | 2007016553 | A1 | 2/2007 |
| WO | WO-2007016553 | A1 | 2/2007 |
| WO | 2008042946 | A2 | 4/2008 |
| WO | 2008044529 | A1 | 4/2008 |
| WO | 2008054267 | A1 | 5/2008 |
| WO | 2008082118 | A1 | 7/2008 |
| WO | WO-2008082118 | A1 | 7/2008 |
| WO | 2008118810 | A1 | 10/2008 |
| WO | WO-2008118810 | A1 | 10/2008 |
| WO | WO-2009023730 | | 2/2009 |
| WO | 2009057960 | A2 | 5/2009 |
| WO | 2009065075 | A1 | 5/2009 |
| WO | WO-2009057960 | A2 | 5/2009 |
| WO | WO-2009065075 | A1 | 5/2009 |
| WO | 2009099361 | A1 | 8/2009 |
| WO | 2009099811 | A1 | 8/2009 |
| WO | WO-2009096757 | A2 | 8/2009 |
| WO | WO-2009099811 | A1 | 8/2009 |
| WO | 2009118707 | A1 | 10/2009 |
| WO | 2009119988 | A1 | 10/2009 |
| WO | 2009120934 | A1 | 10/2009 |
| WO | 2009128404 | A1 | 10/2009 |
| WO | WO-2009118707 | A1 | 10/2009 |
| WO | WO-2009119988 | A1 | 10/2009 |
| WO | WO-2009120465 | A2 | 10/2009 |
| WO | WO-2009120934 | A1 | 10/2009 |
| WO | 2010002230 | A2 | 1/2010 |
| WO | WO-2010002230 | A2 | 1/2010 |
| WO | 2010025270 | A1 | 3/2010 |
| WO | WO-2010025270 | A1 | 3/2010 |
| WO | 2010056763 | A2 | 5/2010 |
| WO | 2010058979 | A2 | 5/2010 |
| WO | WO-2010056763 | A2 | 5/2010 |
| WO | WO-2010058979 | A2 | 5/2010 |
| WO | 2010074444 | A2 | 7/2010 |
| WO | 2010083451 | A2 | 7/2010 |
| WO | WO-2010074444 | A2 | 7/2010 |
| WO | WO-2010083451 | A2 | 7/2010 |
| WO | 2010089408 | A1 | 8/2010 |
| WO | WO-2010089408 | A1 | 8/2010 |
| WO | 2010103886 | A1 | 9/2010 |
| WO | WO-2010103886 | A1 | 9/2010 |
| WO | 2011002389 | A1 | 1/2011 |
| WO | WO-2011002389 | A1 | 1/2011 |
| WO | 2011130447 | A1 | 10/2011 |
| WO | WO-2011130447 | A1 | 10/2011 |
| WO | 2011163265 | A1 | 12/2011 |
| WO | 2011163482 | A1 | 12/2011 |
| WO | WO-2011163265 | A1 | 12/2011 |
| WO | WO-2011163482 | A1 | 12/2011 |
| WO | 2012018894 | A1 | 2/2012 |
| WO | WO-2012018894 | A1 | 2/2012 |

OTHER PUBLICATIONS

CATT: "Analysis of Time-Partitioning Solution for Control Channel", 3GPP TSG RAN WG1 meeting #61bis, R1-103494, Dresden, Germany, Jun. 28-Jul. 2, 2010, pp. 1-3.

CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418504, [retrieved on Feb. 16, 2010].

CMCC: "Discussion on HeNB related interference scenarios and deployment configurations" , 3GPP Draft; R4-091232, 3rd Generation Partnership Project (3GPP), Mobile Competence Centre ; 650, Route Des Lucioles ; F-06921 Sophia-Antipolis Cedex ; France, No. Seoul, Korea; Mar. 30, 2009, Mar. 30. 2009 (Mar. 30, 2009), XP050342009, [retrieved on Mar. 30, 2009] the whole document.

Duplicy, J. et al. (Mar. 8, 2011) "MU-MIMO in LTE Systems," EURASIP Journal on Wireless Communications and Networking, Hindawi Publishing Corporation, vol. 2011, Article ID 496763, pp. 1-13, doi: 10.1155/2011/496763.

Hsieh M-H. et al: "Channel Estimation for OFDM Systems Based on Comb-Type Pilot Arrangement in Frequency Selective Fading Channels" IEEE Transactions on Consumer Electronics, vol. '44, No. 1, Feb. 1, 1998, pp. 217-225.

Huawei: "Correction on CQI reporting", 3GPP Draft; R1-091652 36.213 CR238(REL-8,F) Correction on CQI Reporting, 3rd Generation Partnership Project (3GPP), Mobile Competence Centre ; 650, Route Des Lucioles ; F-06921 Sophia- Antipolis Cedex ; France, No. Seoul, Korea; Mar. 28, 2009, Mar. 28, 2009 (Mar. 28, 2009), XP050339187, [retrieved on Mar. 28, 2009].

Huawei: "CQI Enhancement for Interference Varying Environ-

(56) References Cited

OTHER PUBLICATIONS ments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 12, 2010, Apr. 6, 2010 (Apr. 6, 2010), XP050419318, [retrieved on Apr. 6, 2010].
Huawei: "Enhanced ICIC and Resource-Specific CQI Measurement", 3GPP TSG RAN WG1 meeting #61bis, R1-103900, Dresden, Germany, Jun. 28-Jul. 2, 2010, pp. 1-6.
Intel Corporation (UK) Ltd, "Non-CA based PDCCH Interference Mitigation in LTE-A", 3GPP TSG RAN WG1 Meeting #61 R1-102814 Montreal, Canada, May 10-14, 2010.
International Search Report and Written Opinion—PCT/US2011/032284, ISA/EPO—dated Aug. 29, 2011.
Khandekar A., "LTE-Advanced: Heterogeneous networks", Wireless Conference (EW), 2010 European, Apr. 12-15, 2010, pp. 978-982.
LG Electronics, "Extending Rel-8/9 ICIC for heterogeneous network", 3GPP TSG RAN WG1 Meeting #60bis, R1-102430, Apr. 12-16, 2010, 4 pages.
Nishio A, et al., "Adaptive Transmission Techniques for Control Signaling in 3G-LTE," Panasonic Technical Journal, vol. 55, No. 1, Apr. 2009, pp. 15-20.
NTT DOCOMO: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F- 06921 Sophia-Antipolis Cedex ; France, vol. RAN WG1, No. Beijing, china; Apr. 12, 2010, Apr. 7, 2010 (Apr. 7, 2010), pp. 1-11, XP050419698, [retrieved on Apr. 7, 2010].
Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 25, 2008, Jun. 25, 2008 (Jun. 25, 2008), pp. 1-3, XP050110793, [retrieved on Jun. 25, 2008].
QUALCOMM Incorporated: "Data channel ICIC and the benefits of possible extensions", 3GPP Draft; R1-103562 Data Channel ICIC and the Benefits of Possible Extensions, 3rd Generation Partnership Project (3GPP), Mobile Competence Centre ; 650, Route Des Lucioles ; F-06921 Sophia-Anti Polis Cedex ; France, vol. RAN WG1, No. Dresden, Germany; Jun. 28, 2010, Jun. 28-Jul. 2, 2010 (Jun. 22, 2010), XP050449060, pp. 1-5.
QUALCOMM Incorporated, "Enabling communication in harsh interference scenarios", 3GPP TSG-RAN WG1 #62bis R1-105693 Oct. 10-Oct. 15, 2010 Xian, China.
Research in Motion et al: "On Downlink Single Cell MU-MIMO in LTE-A", 3GPP Draft; R1-094458(RIM-Downlink Single Cell MU-MIMO in LTE-A), 3rd Generation Partnership Project (3GPP), Mobile Competence Centre ; 650, Route Des Lucioles ; F-06921 Sophia-Antipolis Cedex ; France, No. Jeju; Nov. 9, 2009, Nov. 9, 2009 (Nov. 9, 2009), XP050388884, [retrieved on Nov. 3, 2009] p. 3.
Research in Motion, UK Limited, "On Downlink Single Cell MU-MIMO in LTE-A", 3GPP TSG RAN WG1 Meeting #59bis R1-100562, Valencia, Spain, Jan. 18-22, 2010.
Sawahashi M., et al., "Coordinated multi point transmission/reception techniques for LTE-advanced [Coordinated and Distributed MIMO]" IEEE Wireless Communications, IEEE Service Center, Piscataway, NJ, US, vol. 17, No. 3, Jun. 1, 2010 (Jun. 1, 2010), pp. 26-34, XP011311805, ISSN: 1536-1284 p. 30, paragraph Uplink.
Taiwan Search Report—TW100112861—TIPO—dated Mar. 6, 2014.
European Search Report—EP14181547—Search Authority—Munich—dated Nov. 28, 2014.
Samsung: Static/Dynamic Home eNB ICIC function, 3GPP TSG RAN WG1 #61bis R1-103683, Jun. 24, 2010.
CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAM WGI, No. San Francisco, USA; Feb. 22, 2010, Feb. 16, 2010 (Feb. 16, 2010), XP050418504, [retrieved on Feb. 16, 2010].
NTT DOCOMO: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 7, 2010 (Apr. 7, 2010), XP050419698, [retrieved on Apr. 7, 2010].
Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 25, 2008, Jun. 25, 2008 (Jun. 25, 2008), XP050110793, [retrieved on Jun. 25, 2008].
QUALCOMM Incorporated, "Enabling communication in harsh interference scenarios", 3GPP TSG-RAN WG1 #62bis R1-105693 Oct. 11-Oct. 15, 2010 Xian, China.
Research in Motion et al: "On Downlink Single Cell MU-MIMU in LTE-A", 3GPP Draft; R1-094458(RIM-Downlink Single Cell MU-MIMO in LTE-A), 3rd Generation Partnership Project (3GPP), Mobile Competence Centre ; 650, Route Des Lucioles ; F-06921 Sophia-Antipolis Cedex ; France, No. Jeju; Nov. 9, 2009, Nov. 9, 2009 (Nov. 9, 2009), XP050388884, [retrieved on Nov. 3, 2009] p. 3.
Research in Motion, UK Limited, "On Downlink Single Cell MU-MIMO in LTE-A", 3GPP TSG RAN WG1 Meeting #59bis R1-100562, Valencia, Spain, Jan. 18-20, 2010.
Racz A., et al., "On the Impact of Inter-Cell Interference in LTE" Global Telecommunications Conference, 2008, Globecom 2008, IEEE, Piscataway, NJ, USA, Nov. 30, 2008 (Nov. 30, 2008), pp. 1-6, XP031370721 ISBN: 978-1-4244-2324-8 figure 1.

* cited by examiner

CQI ESTIMATION IN A WIRELESS COMMUNICATION NETWORK

The present application for Patent is a Divisional application of and claims priority to of U.S. application Ser. No. 13/084,154, entitled "CQI ESTIMATION IN A WIRELESS COMMUNICATION NETWORK," filed Apr. 11, 2011, which claims priority to Provisional U.S. Application Ser. No. 61/323,822, entitled "CQI ESTIMATION IN A WIRELESS COMMUNICATION NETWORK," filed Apr. 13, 2010, and provisional U.S. Application Ser. No. 61/323,770, entitled "METHOD AND APPARATUS FOR DOWNLINK POWER CONTROL IN LONG TERM EVOLUTION (LTE) NETWORKS," filed Apr. 13, 2010, all of which are assigned to the assignee hereof and incorporated herein by reference in their entirety.

BACKGROUND

I. Field

The present disclosure relates generally to communication, and more specifically to techniques for estimating channel quality indicator (CQI) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may transmit data to a UE. Good performance may be achieved by having the UE estimate the quality of a communication channel from the base station to the UE, determining CQI based on the estimated channel quality, and sending the CQI to the base station. The CQI may indicate the estimated channel quality or a modulation and coding scheme that may be used for data transmission on the communication channel. It may be desirable to accurately estimate and report CQI so that good performance can be achieved for data transmission.

SUMMARY

Techniques for estimating and reporting CQI are described herein. Neighboring base stations may cause strong interference to one another and may be allocated different resources, e.g., different subframes. The resources allocated to each base station may have reduced or no interference from other base stations. The resources not allocated to each base station may have strong interference from other base stations. A UE communicating with a base station may observe different levels/amounts of interference on different resources.

In an aspect, a UE may determine CQI for resources allocated to a base station and having reduced or no interference from at least one interfering base station. In one design, the UE may receive signaling conveying resources (e.g., subframes) allocated to the base station. The UE may determine at least one resource allocated to the base station based on the received signaling. The UE may determine a CQI based on the at least one resource allocated to the base station and may exclude resources allocated to the at least one interfering base station. The UE may send the CQI to the base station and may thereafter receive a transmission of data sent by the base station based on the CQI.

In another aspect, a UE may determine multiple CQIs for resources of different types and associated with different interference levels. In one design, the UE may receive resource partitioning information conveying subframes semi-statically allocated to a base station and subframes semi-statically allocated to at least one interfering base station. The UE may determine at least one first subframe allocated to the base station and at least one second subframe allocated to the at least one interfering base station based on the resource partitioning information. The at least one first subframe may have reduced or no interference from the at least one interfering base station. The UE may determine a first CQI based on the at least one first subframe and may determine a second CQI based on the at least one second subframe. The UE may send the first CQI and the second CQI to the base station. The UE may thereafter receive a transmission of data sent by the base station based on the first CQI and/or the second CQI.

A base station may perform complementary functions to support CQI estimation and reporting by UEs, as described below. Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
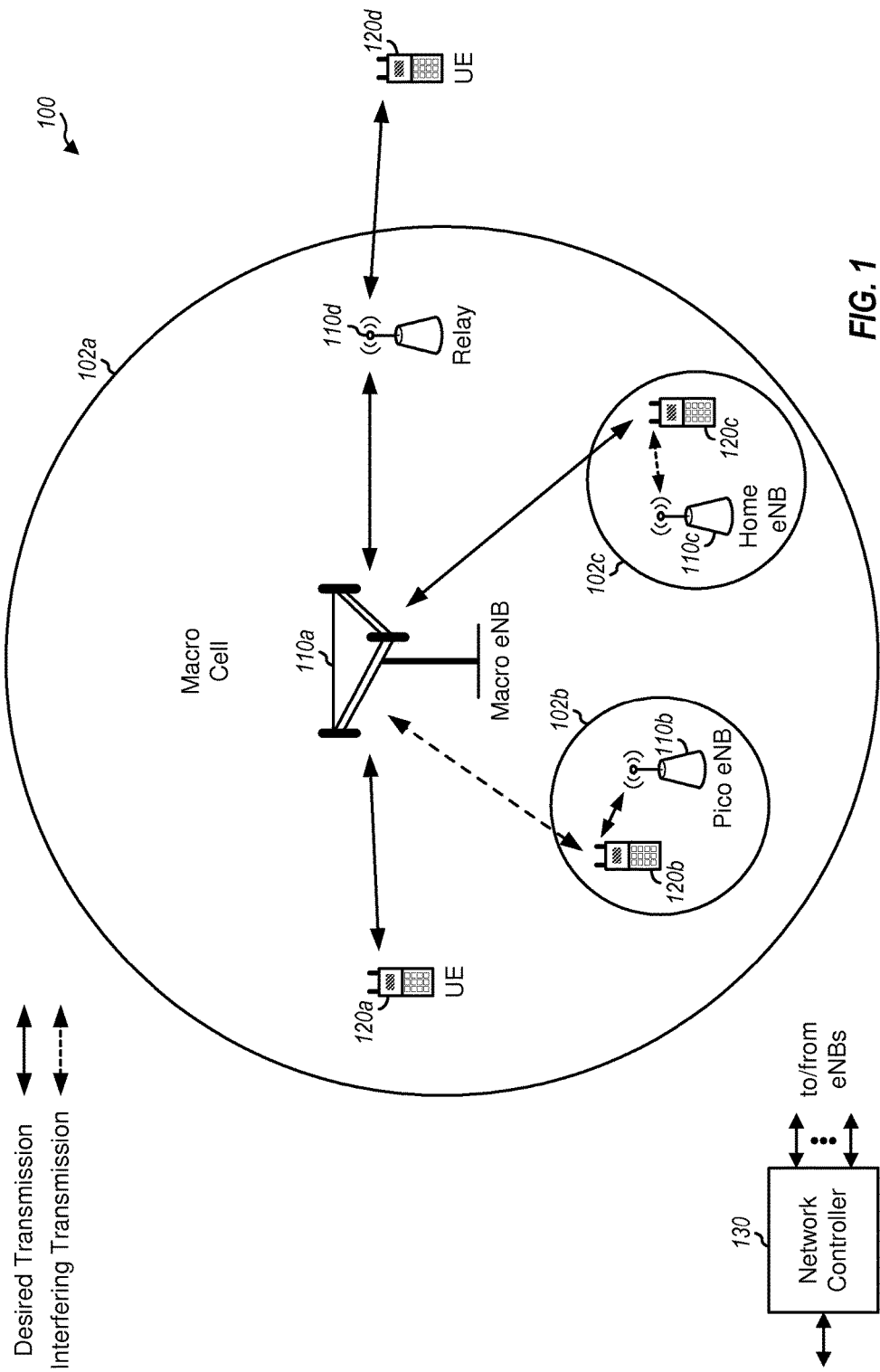
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB). In the example shown in FIG. 1, an eNB 110a may be a macro eNB for a macro cell 102a, an eNB 110b may be a pico eNB for a pico cell 102b, and an eNB 110c may be a home eNB for a femto cell 102c. The terms "eNB" and "base station" are used interchangeably herein.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110d may communicate with macro eNB 110a and a UE 120d in order to facilitate communication between eNB 110a and UE 120d. A relay may also be referred to as a relay station, a relay eNB, a relay base station, etc.

Wireless network 100 may be a heterogeneous network (HetNet) that includes eNBs of different types, e.g., macro eNBs, pico eNBs, home eNBs, relays, etc. These different types of eNBs may have different transmit power levels, different coverage areas, and different impact on interference in wireless network 100. For example, macro eNBs may have a high transmit power level (e.g., 5 to 40 Watts) whereas pico eNBs, HeNBs, and relays may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smartphone, a netbook, a smartbook, a tablet, etc. A UE may communicate with an eNB via the downlink and uplink. The downlink (or forward link) refers to the communication link from the eNB to the UE, and the uplink (or reverse link) refers to the communication link from the UE to the eNB. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 2:
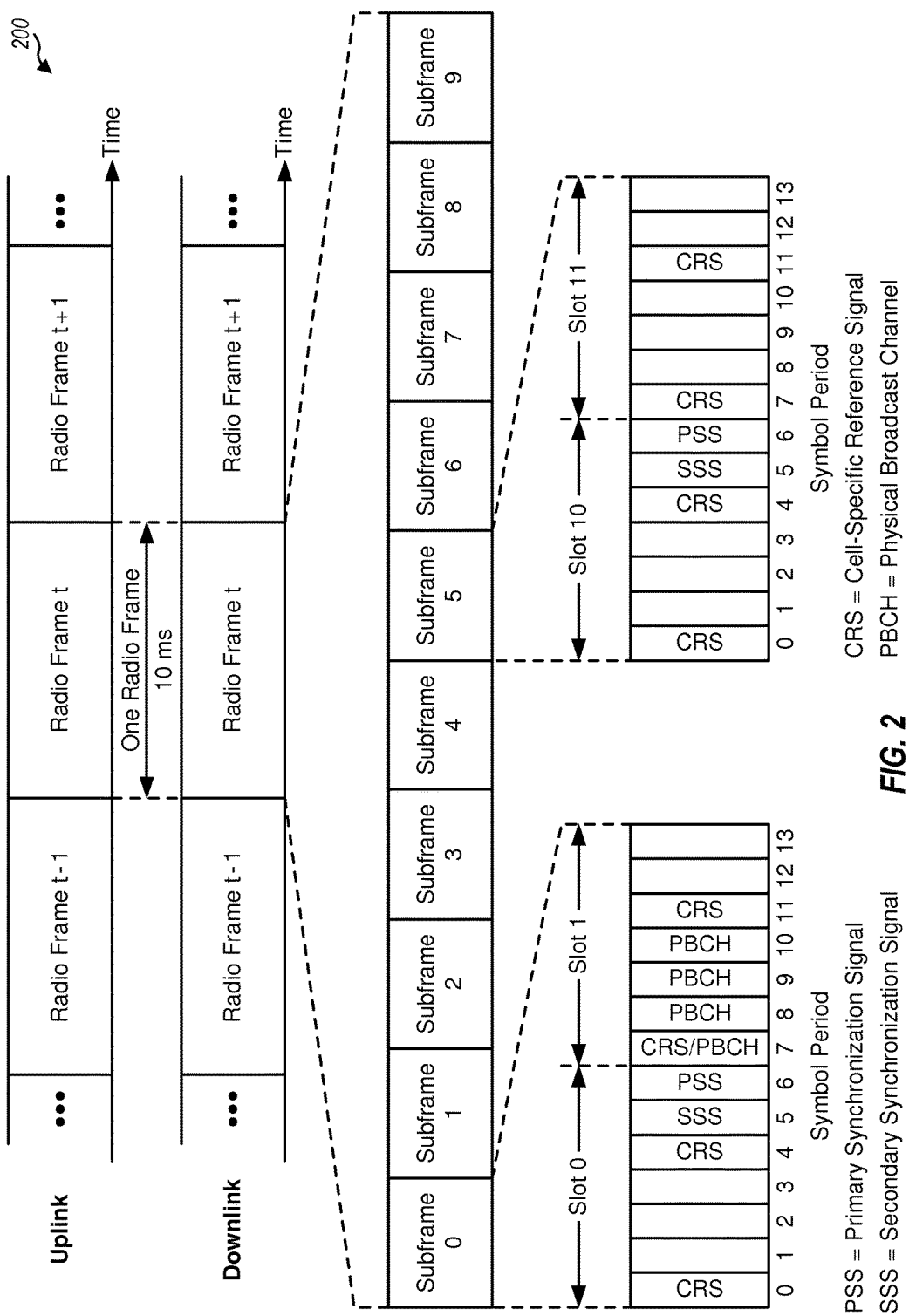
FIG. 2 shows an exemplary frame structure.

FIG. 2 shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2 L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, the subcarrier spacing may be 15 kilohertz (KHz), and $N_{FFT}$ may be equal to 128, 256, 512, 1024 or 2048 for system bandwidth of 1.25, 2.5, 5, 10 or 20 megahertz (MHz), respectively. The system bandwidth may also be partitioned into subbands. Each subband may cover a range of frequencies, e.g., 1.08 MHz or some other range.

The available time frequency resources for each of the downlink and uplink may be partitioned into resource blocks. The number of resource blocks available in a slot for each link may be dependent on the system bandwidth and may range from 6 to 110 for system bandwidth of 1.25 to 20 MHz, respectively. Each resource block may cover 12 subcarriers in one slot and may include a number of resource elements. Each resource element may cover one subcarrier in one symbol period and may be used to send one modulation symbol, which may be a real or complex value.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 2. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes.

Figure 3:
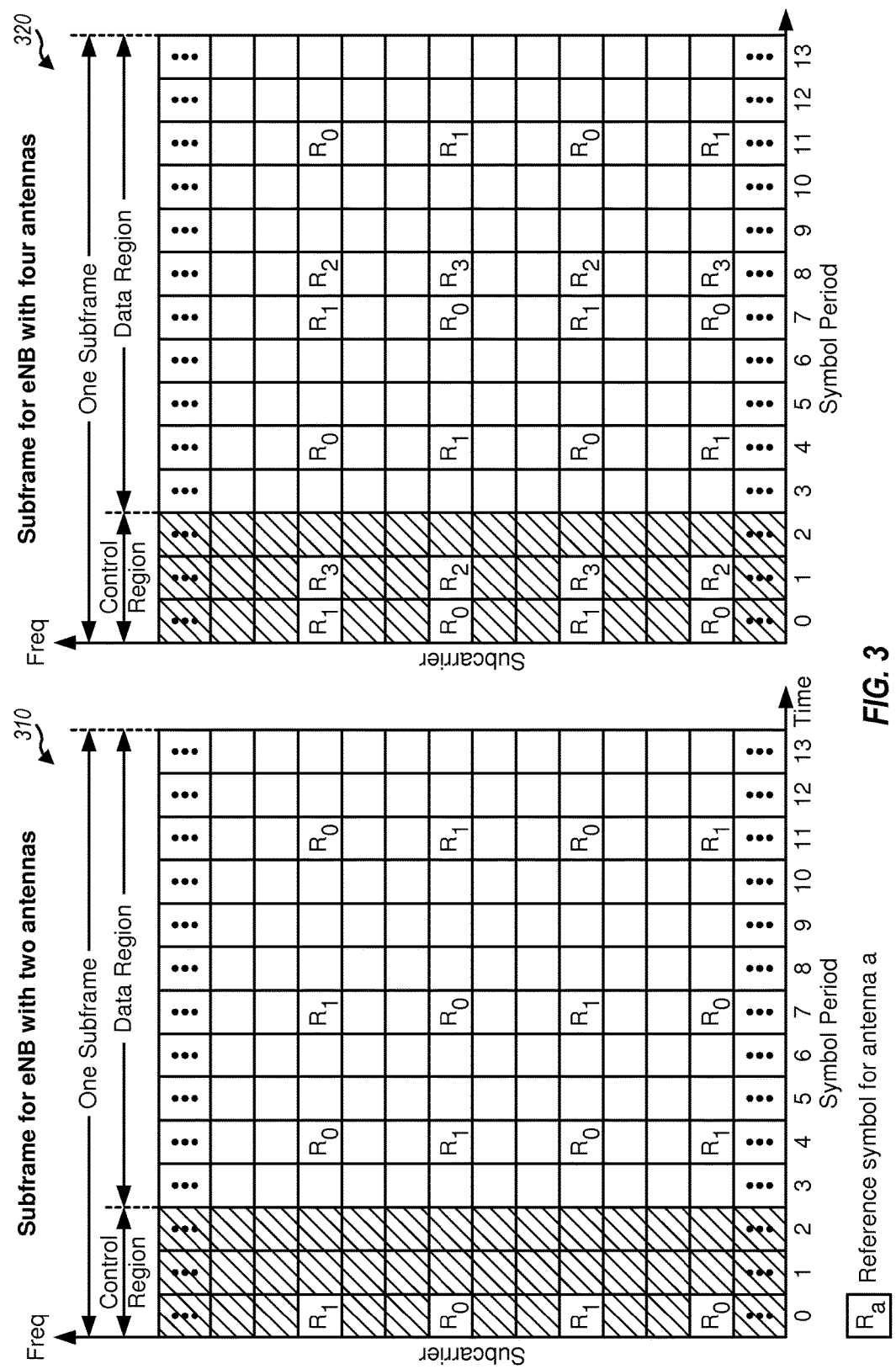
FIG. 3 shows two exemplary subframe formats.

FIG. 3 shows two exemplary subframe formats 310 and 320 for the downlink with the normal cyclic prefix. Subframe format 310 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 3, for a given resource element with label $R_a$, a modulation symbol may be transmitted on that resource element from antenna a, and no modulation symbols may be transmitted on that resource element from other antennas. Subframe format 320 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 310 and 320, a CRS may be transmitted on evenly spaced subcarriers, which may be determined based on the cell ID. Different eNBs may transmit their CRSs on the same or different subcarriers, depending on their cell IDs. For both subframe formats 310 and 320, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

Figure 4:
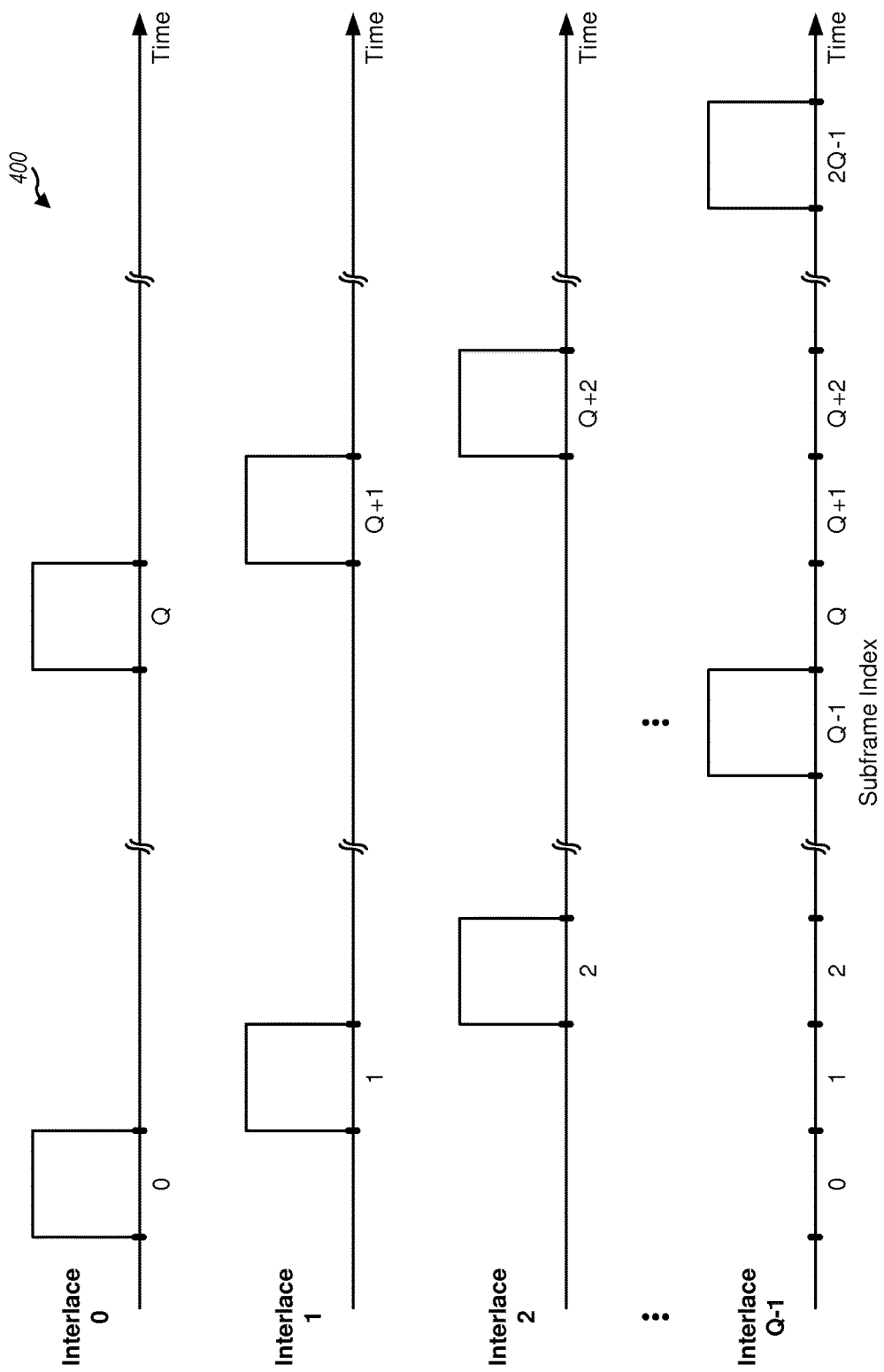
FIG. 4 shows an exemplary interlace structure.

FIG. 4 shows an exemplary interlace structure 400, which may be used for each of the downlink and uplink for FDD in LTE. As shown in FIG. 4, Q interlaces with indices of 0 through Q−1 may be defined, where Q may be equal to 4, 6, 8, 10, or some other value. Each interlace may include subframes that are spaced apart by Q subframes. In particular, interlace q may include subframes q, q+Q, q+2Q, etc., where q∈{0, . . . , Q−1}.

The wireless network may support data transmission with hybrid automatic retransmission (HARQ) on the downlink and/or uplink. For HARQ, a transmitter (e.g., an eNB) may send an initial transmission of a data packet and may thereafter send one or more additional transmissions of the packet, if needed, until the packet is decoded correctly by a receiver (e.g., a UE), or the maximum number of transmissions has been sent, or some other termination condition is encountered. After each transmission of the packet, the receiver may decode all received transmissions of the packet to attempt to recover the packet. The receiver may send an acknowledgement (ACK) if the packet is decoded correctly or a negative acknowledgement (NACK) if the packet is decoded in error. The transmitter may send another transmission of the packet if a NACK is received and may terminate transmission of the packet if an ACK is received. The transmitter may process (e.g., encode and modulate) the packet based on a modulation and coding scheme (MCS), which may be selected such that the packet can be decoded correctly with high probability after a target number of transmissions of the packet. This target number of transmissions may be referred to as a HARQ target termination.

For synchronous HARQ, all transmissions of a packet may be sent in subframes of a single interlace. For asynchronous HARQ, each transmission of a packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), a carrier-to-interference ratio (C/I), a reference signal received quality (RSRQ), etc. For clarity, SINR is used to denote received signal quality in much of the description below.

A UE may operate in a dominant interference scenario in which the UE may observe strong interference from one or more interfering eNBs. A dominant interference scenario may occur due to restricted association. For example, in FIG. 1, UE 120c may be close to HeNB 110c and may have high received power for eNB 110c. However, UE 120c may not be able to access HeNB 110c due to restricted association and may then connect to macro eNB 110a with lower received power. UE 120c may then observe strong interference from HeNB 110c on the downlink and may also cause strong interference to HeNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Communication in a dominant interference scenario may be supported by performing inter-cell interference coordination (ICIC). In one design of ICIC, resource partitioning/coordination may be performed to allocate resources to an eNB located near the vicinity of one or more strong interfering eNBs. The interfering eNB(s) may avoid transmitting or may transmit at lower power levels on the allocated resources, possibly except for the CRS. A UE can then reliably communicate with the eNB on the allocated resources in the presence of the interfering eNB(s) and may observe reduced or no interference (possibly except for the CRS) from the interfering eNB(s). For example, in FIG. 1, some resources may be allocated to pico eNB 110b and may have reduced or no interference from interfering macro eNB 110a. Pico eNB 110b can then reliably communicate with UE 120b on the allocated resources.

In general, time and/or frequency resources may be allocated to eNBs via resource partitioning. In one design, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning scheme in which one or more interlaces may be allocated to an eNB. The subframes of the allocated interlace(s) may observe reduced or no interference from strong interfering eNBs. TDM resource partitioning may be especially applicable in a co-channel deployment in which macro eNBs and other types of eNBs operate on the same frequency channel.

In general, resource partitioning may be performed by a group of eNBs (e.g., through negotiation via the backhaul) or by a designated network entity (e.g., network controller 130 in FIG. 1) for the group of eNBs. In one design, each eNB may be allocated some resources (e.g., some subframes) that can be used by that eNB and have reduced or no interference from other eNBs in the group. In one design, the resource partitioning may be performed in a semi-static manner. In another design, the resource partitioning may be performed in a semi-static and dynamic/adaptive manner. For example, some minimum resources (e.g., a minimum number of subframes) may be semi-statically allocated to an eNB and additional resources (e.g., additional subframes) may be dynamically or adaptively allocated to the eNB. The semi-statically allocated resources may ensure that each eNB has sufficient resources to reliably send control data to support communication with its UEs. The dynamically allocated resources may be dependent on traffic load of different eNBs and may be used to send traffic data and/or other data. For clarity, much of the description below assumes semi-static and dynamic resource allocation.

Figure 5:
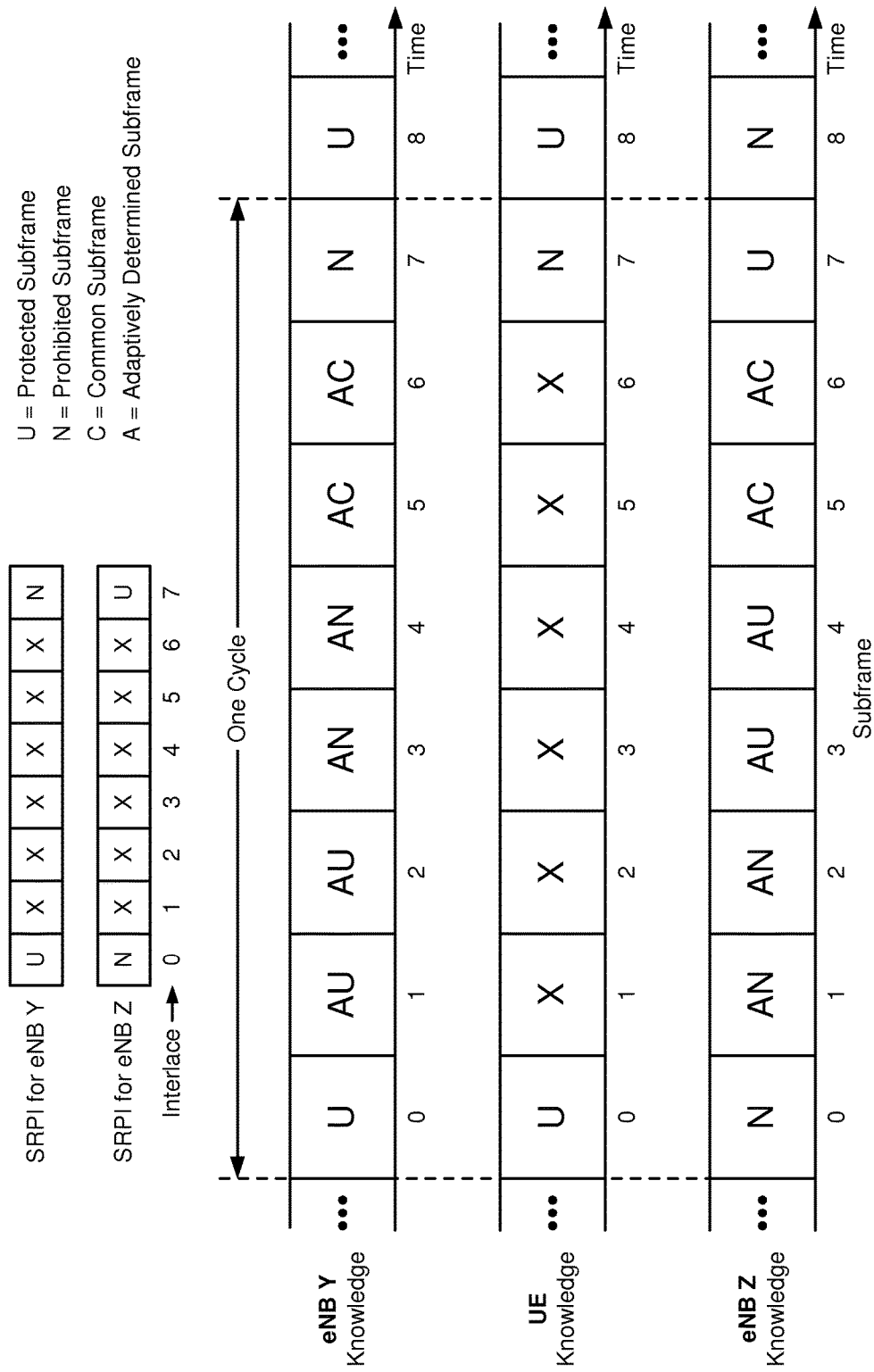
FIG. 5 shows an example of resource partitioning for two base stations.

FIG. 5 shows an example of TDM resource partitioning to support communication in a dominant interference scenario involving two eNBs Y and Z. In this example, eNB Y may be allocated interlace 0, and eNB Z may be allocated interlace 7 in a semi-static manner, e.g., via negotiation between the eNBs through the backhaul. eNB Y can transmit in subframes of interlace 0 and may avoid transmitting or may transmit at a lower power level in subframes of interlace 7. Conversely, eNB Z can transmit in subframes of interlace 7 and may avoid transmitting or may transmit at a lower power level in subframes of interlace 0. The subframes of the remaining interlaces 1 through 6 may be dynamically/adaptively allocated to eNB Y and/or eNB Z.

Table 1 lists different types of subframes in accordance with one design. From the perspective of eNB Y, an interlace allocated to eNB Y may include "protected" subframes (denoted as U subframes) that can be used by eNB Y and having reduced or no interference from interfering eNBs. An interlace allocated to another eNB Z may include "prohibited" subframes (denoted as N subframes) that cannot be used by eNB Y or may be used at a lower transmit power level. An interlace not allocated to any eNB may include "common" subframes (denoted as C subframes) that can be used by different eNBs. A subframe that is dynamically allocated is denoted with an "A" prefix and may be a protected subframe (denoted as an AU subframe), or a prohibited subframe (denoted as an AN subframe), or a common subframe (denoted as an AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
| --- | --- | --- |
| U | Protected subframe that can be used for data transmission and having reduced or no interference from interfering eNBs. | High CQI |
| N | Prohibited subframe that may not be used for data transmission or may be used at a lower transmit power level. | Low CQI |
| C | Common subframe that can be used for data transmission by different eNBs. | Low to High CQI |

In one design, an eNB may transmit (e.g., broadcast) static resource partitioning information (SRPI) to its UEs. In one design, the SRPI may comprise Q fields for the Q interlaces. In one design, the field for each interlace may be set (i) to "U" to indicate the interlace being allocated to the eNB and including U subframes, or (ii) to "N" to indicate the interlace being allocated to another eNB and including N subframes, or (iii) to "X" to indicate the interlace being dynamically allocated to any eNB and including X subframes. An X subframe may be an AU subframe allocated to the eNB, an AN subframe allocated to another eNB, or an AC subframe that can be used by different eNBs.

A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may have only partial knowledge of the resource partitioning and may know only the semi-static part of the resource partitioning via the SRPI. The eNB may have full knowledge of the resource partitioning and may know both the semi-static part and the dynamic part of the resource partitioning.

A UE may estimate SINR of an eNB based on a CRS received from the eNB. The UE may determine CQI based on the estimated SINR and may report the CQI to the eNB. The eNB may use the CQI for link adaptation to select a modulation and coding scheme (MCS) for data transmission to the UE. Different types of subframes may have different levels of interference and hence may be associated with very different CQIs. In particular, protected subframes (e.g., U and AU subframes) may be characterized by better CQI since dominant interfering eNBs do not transmit or transmit at lower power levels in these subframes. In contrast, CQI may be much worse for other subframes (e.g., N, AN, C and AC subframes) in which one or more dominant interfering eNBs can transmit at higher power levels. From the point of view of CQI, AU subframes may be equivalent to U subframes (since both are protected subframes), and AN subframes may be equivalent to N subframes (since both are prohibited subframes). AC subframes may be different from U and AU subframes and also from N and AN subframes. Hence, AC subframes may be characterized by a completely different CQI than the CQI for U and AU subframes and the CQI for N and AN subframes. To achieve good link adaptation performance, an eNB should have relatively accurate CQI for each subframe in which the eNB may transmit data to a UE.

In an aspect, a UE may determine CQI for protected subframes having reduced or no interference from interfering eNBs. The protected subframes may be selected first by an eNB for transmission of data to the UE since the CQI for these subframes may likely be higher due to protection from the interfering eNBs. A CQI for one or more protected subframes may be referred to as a "clean" CQI to emphasize that it is measured over subframe(s) in which dominant interfering eNBs do not transmit or transmit at a lower power level.

In another aspect, a UE may determine multiple CQIs for different types of subframes, which may observe different levels of interference and hence may be associated with different CQIs. In one design, a clean CQI may be obtained for one or more protected subframes, and at least one additional CQI may be obtained for at least one reference subframe. A reference subframe is a subframe used to determine/estimate an additional CQI. A reference subframe may be a subframe that is not a protected subframe and may be an N, AN, C, or AC subframe. A CQI for one or more reference subframes may be referred to as an "unclean" CQI to emphasize that it is measured over one or more subframes in which one or more interfering eNBs may be transmitting at a high power level.

In one design, a number of CQI modes may be supported, and a UE may determine one or more CQIs in each CQI mode. Table 2 lists three CQI modes that may be supported, in accordance with one design.

TABLE 2

CQI Modes

| CQI Mode | Description |
|---|---|
| CQI Mode 1 | UE determines only a clean CQI for one or more protected subframes. |
| CQI Mode 2 | UE determines a clean CQI for one or more protected subframes and an unclean CQI for one or more reference subframes. |
| CQI Mode 3 | UE determines a clean CQI for one or more protected subframes and multiple unclean CQIs for different reference subframes. |

CQI mode 1 may be compatible with CQI modes that do not support unclean CQI. However, a clean CQI alone may not be sufficient for an eNB scheduler, especially when there is a large amount of traffic data on the downlink and all of the traffic data cannot be scheduled in U subframes. If the eNB schedules the UE on an AC subframe, then the clean CQI may be too optimistic since AC subframes are not protected, and performance of data transmission in these AC subframes may be poor. CQI mode 2 may be used to determine and report both a clean CQI and an unclean CQI. CQI mode 3 may be used to determine and report a clean CQI and multiple unclean CQIs. The number of unclean CQIs to report may be selected based on a tradeoff between signaling overhead to report the unclean CQIs and improvement in data transmission performance with the multiple unclean CQIs. CQI modes 2 and 3 may provide the eNB with more flexibility to schedule the UE on either a protected subframe or some other subframe and still achieve good performance for data transmission. For CQI modes 2 and 3, a combination of clean and unclean CQIs may be referred to as vectorial CQI.

An unclean CQI may be determined for one or more reference subframes, which may be selected in various manners. In one design, the subframe(s) used to determine an unclean CQI may be selected by a UE. The UE may select one or more reference subframes to use to determine an unclean CQI based on its limited knowledge of only the location of U and N subframes for an eNB. In another design, the subframe(s) used to determine an unclean CQI may be selected by an eNB and signaled to a UE.

In a first design, an unclean CQI may be determined based only on one or more N subframes (and not subframes of other types). The N subframe(s) used to determine the unclean CQI may be selected in various manners. In one design, the N subframe(s) may be configured by an eNB and signaled to the UE. For example, the UE may be configured to determine an unclean CQI for every P-th subframe in one or more interlaces containing N subframes, where P may be any value. In another design, the UE may be configured to determine an unclean CQI for an N subframe that is as close as possible to a subframe in which a CQI report is transmitted by the UE. For example, the UE may send a CQI report in subframe n, and the N subframe to use to determine the unclean CQI may be subframe n-m, where m may be the smallest integer that is equal to or larger than $m_{min}$ (i.e., $m \geq m_{min}$) such that subframe n-m is an N subframe. $m_{min}$ may be a minimum delay between CQI estimation and reporting and may be equal to four or some other value. The N subframe(s) used to determine the unclean CQI may also be selected in other manners. The UE may not be scheduled for data transmission in N subframes, which may be protected subframes for another eNB. An unclean CQI determined based on N subframe(s) may represent a worst-case CQI for the UE.

In a second design, an unclean CQI may be determined by averaging over a set of subframes, which may exclude U subframes. In one design, the set of subframes may be configured by the eNB and signaled to the UE. For the example shown in FIG. 5, the UE may be configured to determine an unclean CQI for subframes 1 through 7. In another design, the set of subframes may be dependent on when a CQI report is sent by the UE. For example, the UE may send a CQI report in subframe n, and the set of subframes used to determine the unclean CQI may include subframes n-k, for $k_{min} \leq k \leq k_{max}$, but excluding any U subframe. In one design, $k_{min}$ and/or $k_{max}$ may be fixed values, e.g., specified in a standard. For example, $k_{min}$ may be equal to a fixed value of 4 or some other value. As another example, $k_{max} - k_{min}$ may be equal to a fixed value of 8 or some other value. In another design, $k_{min}$ and/or $k_{max}$ may be determined by the UE based on resource partitioning and/or other information. For example, $k_{min}$ may be equal to a fixed value of 4, and $k_{max}$ may be determined based on the number of interlaces, Q (e.g., $k_{max} = k_{min} + Q - 1$). For the example shown in FIG. 5 with Q=8, the set of subframes may include up to eight non-U subframes that are 4 to 11 subframes earlier than subframe n. In another design, $k_{min}$ and/or $k_{max}$ may be configured by the eNB and signaled to the UE. For all designs, the UE may estimate the SINR of each subframe in the set of subframes. The UE may then average the SINRs of all subframes in the set to obtain an average SINR. The UE may then determine the unclean CQI based on the average SINR.

In a third design, an unclean CQI may be determined by averaging over a set of subframes, which may exclude N and U subframes. In one design, the set of subframes may be configured by the eNB and signaled to the UE. In another design, the set of subframes may be dependent on when a CQI report is sent by the UE. For example, the UE may send a CQI report in subframe n, and the set of subframes used to determine the unclean CQI may include subframes n-k, for $k_{min} \leq k \leq k_{max}$, but excluding any U subframe and any N subframe.

In a fourth design, an unclean CQI may be determined by separately estimating interference in N and U subframes and estimating the total interference observed by the UE. The U subframes may include no interference from dominant interfering eNBs (possibly except for the CRS) but may include interference from other eNBs. The N subframes may include interference from interfering eNB(s) allocated these subframes but may include no interference from other eNBs. For example, subframes may be allocated to eNBs of different power classes, U subframes may be allocated to macro eNBs, and N subframes may be allocated to pico and/or home eNBs. The UE may communicate with a macro eNB and may observe interference from other macro eNBs in the same power class in U subframes. The UE may observe interference from pico and home eNBs in N subframes.

Hence, the UE may observe interference from different interfering eNBs in different subframes, and neither U subframes nor N subframes may capture the total interference observed by the UE. The eNB may desire to know the total (worst-case) interference observed by the UE. In this case, the UE may separately estimate interference in the N subframes and the U subframes. The UE may then combine the estimated interference for the N subframes and the estimated interference for the U subframes based on a suitable combining function to obtain the total interference. The combining function should avoid double counting of the interference from any given interfering eNB. For example, if an interfering eNB transmits in both an N subframe and a U subframe, then the estimated interference for this interfering eNB from either the N subframe or the U subframe (and not both subframes) may be used to compute the total interference.

The UE may estimate interference for each interfering eNB based on the CRS transmitted by that eNB. The CRSs from different eNBs may or may not collide depending on their cell IDs. If the CRSs from different eNBs collide, then the UE may perform reference signal interference cancellation (RS IC). For example, if the CRSs from eNBs Y and Z collide, then the UE may estimate and cancel the interference due to the CRS from eNB Y before measuring the CRS from eNB Z, and vice versa. A more accurate measurement of a CRS from an eNB may be obtained by canceling interference due to the CRSs from other eNBs. The interference due to a given eNB in a given subframe may be estimated based on the received power of the CRS from the eNB in the subframe (possibly after estimating and canceling the CRSs from other eNBs in the subframe).

The total interference may be determined based on the estimated interference for different types of subframes, including U and N subframes. The combining function may be designed to provide an accurate estimate of the total interference based on the estimated interference for U subframes, the estimated interference for N subframes, and the estimated interference for other subframes. The UE may determine an unclean CQI based on the total interference.

In a fifth design, an unclean CQI may be determined for one or more reference subframes selected in a predetermined manner. In one design, different subframes may be selected by cycling through different offsets and selecting one or more subframes for determining an unclean CQI in each CQI reporting period. For example, the UE may send a CQI report in subframe n, and subframe $n-m_{min}-k_i$ may be used to determine an unclean CQI, where $k_i$ denotes a subframe offset for reporting period i and $m_{min}$ is a fixed delay (e.g., $m_{min}=4$).

Reporting index i may range from 0 through $k_{K-1}$ where K may denote the number of offsets and may be any value. Index i may be initialized to zero after a successful access procedure, or after an update of a cqi-pmi-configIndex from upper layer, or based on some other event. Index i may be incremented by one after each CQI reporting, e.g., i=(i+1) mod K.

The number of offsets (K) and/or the K offsets $k_0$ through $k_{K-1}$ for the K reporting periods 0 through K−1, respectively, may be determined in various manners. In one design, the number of offsets and/or the K offsets may be fixed values. For example, the number of offsets may be equal to a fixed value of 2, 4, or some other value, and the K offsets may include offsets 0 through K−1. In another design, the number of offsets and/or the K offsets may be dependent on resource partitioning. For example, the number of offsets may be equal to the number of interlaces (or K=Q), and the Q offsets may include 0 through Q−1. In yet another design, the number of offsets (K) and/or the K offsets $k_0$ through $k_{K-1}$ may be configured by the eNB and signaled to the UE.

For the fifth design, an unclean CQI reported in subframe n may be determined based on a single subframe $n-m_{min}-k_i$, as described above. An unclean CQI may also be determined based on multiple subframes, e.g., subframe $n-m_{min}-k_i$ through subframe $n-m_{min}-k_i-S+1$, where S is the number of subframes to average for the unclean CQI. For both cases, multiple unclean CQIs may be effectively determined and reported by cycling through different offsets to select different subframes in which to determine unclean CQI.

Five exemplary designs for selecting one or more reference subframes to use to determine an unclean CQI have been described above. An unclean CQI may also be determined for one or more reference subframes that may be selected in other manners.

A UE may select reference subframes to use to determine multiple unclean CQIs in various manners. In a first design, one unclean CQI may be determined for one or more N subframes, and another unclean CQI may be determined for one or more X subframes. In a second design, multiple unclean CQIs may be determined for multiple subframes with different offsets. The subframes used to determine multiple unclean CQIs may also be determined in other manners.

An eNB may select reference subframes to use to determine an unclean CQI and may signal the selected subframes to the UE. In one design, one or more reference subframes used to determine an unclean CQI may be a fixed offset with respect to one or more subframes to use to determine a clean CQI. In another design, one or more reference subframes to use to determine an unclean CQI may be a fixed offset with respect to a subframe for CQI reporting. For example, the UE may send a CQI report in subframe n, and a reference subframe used to determine an unclean CQI may be subframe $n-k_i$, where $k_i$ may be a fixed offset. For both designs, the offset may be determined by the eNB and signaled to the UE, e.g., via new cqi-pmi-configIndex configurations or a new field for applicable Radio Resource Control (RRC) messages. The eNB may change the offset (e.g., once in a while) and may send the new offset to the UE. The eNB may also select reference subframe(s) used to determine an unclean CQI in other manners.

For the offset-based designs described above, the offset may be determined in different manners for FDD and TDD. For FDD (e.g., as shown in FIGS. 2 and 5), all 10 subframes of a radio frame may be available for the downlink, and an offset may be determined in a straightforward manner. For TDD, only some of the 10 subframes of each radio frame may be available for the downlink, and an offset may take into account valid subframes for the downlink. For example, an offset of 3 in TDD may mean 3 valid subframes for the downlink before a subframe used to determine a clean CQI or an unclean CQI.

Clean and unclean CQIs may be determined and reported at any periodicities. In one design, clean and unclean CQIs may be determined and reported at the same periodicity, e.g., in the same subframe or different subframes. In another design, clean and unclean CQIs may be determined and reported at different periodicities. For example, a clean CQI may be determined and reported more frequently than an unclean CQI. In one design, a periodicity of Q or an integer multiple of Q may be used for a clean CQI. A periodicity of any value that is not an integer multiple of Q may implicitly cycle through various subframes for an unclean CQI. For example, if Q=8 as shown in FIG. 5, then a periodicity of 9 may cycle through all subframes in different reporting periods. In one design, the same or different periodicities for clean and unclean CQIs may be configured for a UE by an eNB and signaled to the UE.

In one design, the same CQI configuration may be used for both clean and unclean CQIs. In another design, different CQI configurations may be used for clean and unclean CQIs. A CQI configuration may be associated with various parameters for estimating and/or reporting CQI. For example, a CQI configuration may indicate a periodicity of reporting CQI, specific subframes in which to report CQI, a specific offset to determine one or more subframes used to estimate CQI, etc.

An eNB may maintain a setpoint for a transmission of data (e.g., traffic data and/or control data) on the downlink to a UE. The setpoint may correspond to a target SINR for the transmission of data. The setpoint may be adjusted based on a power control loop (which may be referred to as an outer loop) to obtain a desired level of performance for the transmission of data. This desired level of performance may be quantified by a target error rate, a target erasure rate, or some other metric. For example, the setpoint may be (i) increased to a higher target SINR if performance is worse than the target error rate or (ii) decreased to a lower target SINR if performance is better than the target error rate. The setpoint and an estimated SINR may be used to determine the transmit power level for the transmission of data. For example, if a transmit power level of P1 results in an estimated SINR of X decibels (dB) and the setpoint is Y dB, then the transmit power level may be adjusted by (Y−X) dB to (P1+Y−X). In general, a higher setpoint and/or a lower estimated SINR may correspond to higher transmit power, and vice versa. Transmit power may be given by a transmit power spectral density (PSD), which may be indicative of transmit power per unit frequency (e.g., per subcarrier). The estimated SINR may be obtained from one or more CQIs reported by an UE.

Subframes of different types may observe different levels of interference and hence may be associated with different SINRs for a given amount of transmit power from an eNB. A single setpoint may be used for all subframes of different types and may be adjusted by an outer loop based on widely varying SINRs for the subframes of different types. However, the outer loop may not converge due to large fluctuations in the SINRs or may converge to a very conservative value, both of which may be undesirable.

In another aspect, an eNB may maintain multiple setpoints for different types of subframes. In one design, the eNB may maintain a first setpoint for protected subframes (e.g., U and AU subframes) and a second setpoint for remaining subframes. In another design, the eNB may maintain a first setpoint for U and AU subframes, a second setpoint for N and AN subframes, and a third setpoint for AC subframes. In general, the eNB may maintain any number of setpoints for any number of subframe types. Different subframe types may be associated with different levels of interference and hence different SINRs.

In one design, an eNB may maintain multiple setpoints for different subframe types for each UE of interest. In another design, an eNB may maintain multiple setpoints for different subframe types for a group of UEs or all UEs. In one design, an eNB may maintain multiple setpoints for different subframe types for each type of transmission (e.g., for each physical channel). In another design, an eNB may maintain multiple setpoints for different subframe types for all types of transmission (e.g., for all physical channels). In yet another design, an eNB may maintain multiple setpoints for different subframe types for each type of transmission (e.g., for each physical channel) for each UE. An eNB may also maintain multiple setpoints for different subframe types in other manners.

An eNB may determine multiple setpoints for different subframe types in various manners. In one design, the eNB may set the setpoint for a subframe type based on a target level of performance and measured performance for the subframe type, as described above. For data transmission with HARQ, the eNB may use a lower setpoint for a longer HARQ target termination, and vice versa. In another design, the eNB may set the setpoint for a subframe type based on estimated interference in subframes of that type. For example, the eNB may use a lower setpoint for higher estimated interference, and vice versa.

In one design, an eNB may independently determine the setpoint for each subframe type. In another design, an eNB may determine a first setpoint for a first subframe type and may determine a second setpoint for a second subframe type based on the first setpoint and an offset. This offset may be a fixed value or an adjustable value, which may be varied based on measured interference or measured performance. The eNB may determine one or more additional setpoints for one or more other subframe types based on one or more additional offsets.

An eNB may transmit control data and/or traffic data to a UE in a subframe based on a setpoint applicable for the UE for that subframe. The setpoint may be used to determine the transmit power level to use for transmission of data to the UE in the subframe.

An eNB may transmit a Physical Control Format Indicator Channel (PCFICH), a Physical HARQ Indicator Channel (PHICH), and a Physical Downlink Control Channel (PDCCH) in the control region of a subframe. The PCFICH may be transmitted in the first symbol period of the subframe and may convey the size of the control region. The PHICH may carry ACK and NACK for data transmissions sent by UEs on the uplink with HARQ. The PDCCH may carry control data/information for downlink grants, uplink grants, power control information, etc. The PDCCH may be transmitted in 1, 2, 4 or 8 control channel elements (CCEs), with each CCE including 36 resource elements. The eNB may transmit the PDSCH in the data region of a subframe. The PDSCH may carry data for UEs scheduled for transmission of traffic data on the downlink.

An eNB may send control data on the PDCCH to a UE in a subframe. In one design, the eNB may maintain multiple setpoints (or target PDCCH SINRs) for different subframe types for the UE for the PDCCH. The eNB may set the transmit power of the PDCCH based on a setpoint for the subframe in which the PDCCH is sent. For example, the eNB may use (i) higher transmit power for the PDCCH for a higher setpoint or (ii) lower transmit power for the PDCCH for a lower setpoint. The eNB may also set the transmit power of the PDCCH based on CQI received from the UE for the subframe. For example, the eNB may use (i) higher transmit power for the PDCCH for a lower CQI value indicative of poor channel quality or (ii) lower transmit power for the PDCCH for a higher CQI value indicative of good channel quality. The eNB may also set the transmit power of the PDCCH based on other factors. Alternatively, the eNB may use a fixed transmit power level for the PDCCH but may vary the number of CCEs used for transmission of control data on the PDCCH. For example, the eNB may transmit the PDCCH using (i) more CCEs for a higher setpoint and/or a lower CQI value or (ii) fewer CCEs for a lower setpoint and/or a higher CQI value.

An eNB may send ACK/NACK on the PHICH to a UE in a subframe. In one design, the eNB may maintain multiple setpoints (or target PHICH SINRs) for different subframe types for the UE for the PHICH. The eNB may set the transmit power of the PHICH based on the target PHICH SINR and CQI received from the UE for the subframe in which the PHICH is sent.

An eNB may send traffic data on the PDSCH to a UE in a subframe. In one design, the eNB may maintain multiple setpoints (or target PDSCH SINRs) for different subframe types for the UE for the PDSCH. The eNB may set the transmit power of the PDSCH based on the target PDSCH SINR and CQI received from the UE for the subframe in which the PDSCH is sent. The eNB may set the transmit power of the PDSCH based further on a target level of performance for the traffic data sent on the PDSCH. For example, the transmit power of the PDSCH may be set to meet a target packet error rate (PER) of 1% (or some other value) based on a target number of transmissions of a packet. The eNB may set the transmit power of the PDSCH based further on a HARQ target termination. For example, the transmit power of the PDSCH may be set to meet a target PER based on the first transmission of a packet. In one design, progressively lower setpoints may be selected for progressively higher HARQ target terminations. Adjusting the transmit power of the PDSCH to obtain the desired HARQ target termination may be useful for certain traffic types such as, e.g., voice-over-Internet Protocol (VoIP).

The use of multiple setpoints for different subframe types may provide certain advantages. In a wireless network utilizing TDM resource partitioning for ICIC, e.g., as described above, interference on the downlink may vary significantly across subframes. The use of multiple setpoints may enable an eNB to apply the proper transmit power level in different subframes to achieve the desired coverage within a cell under different interference scenarios.

Figures 6, 7:
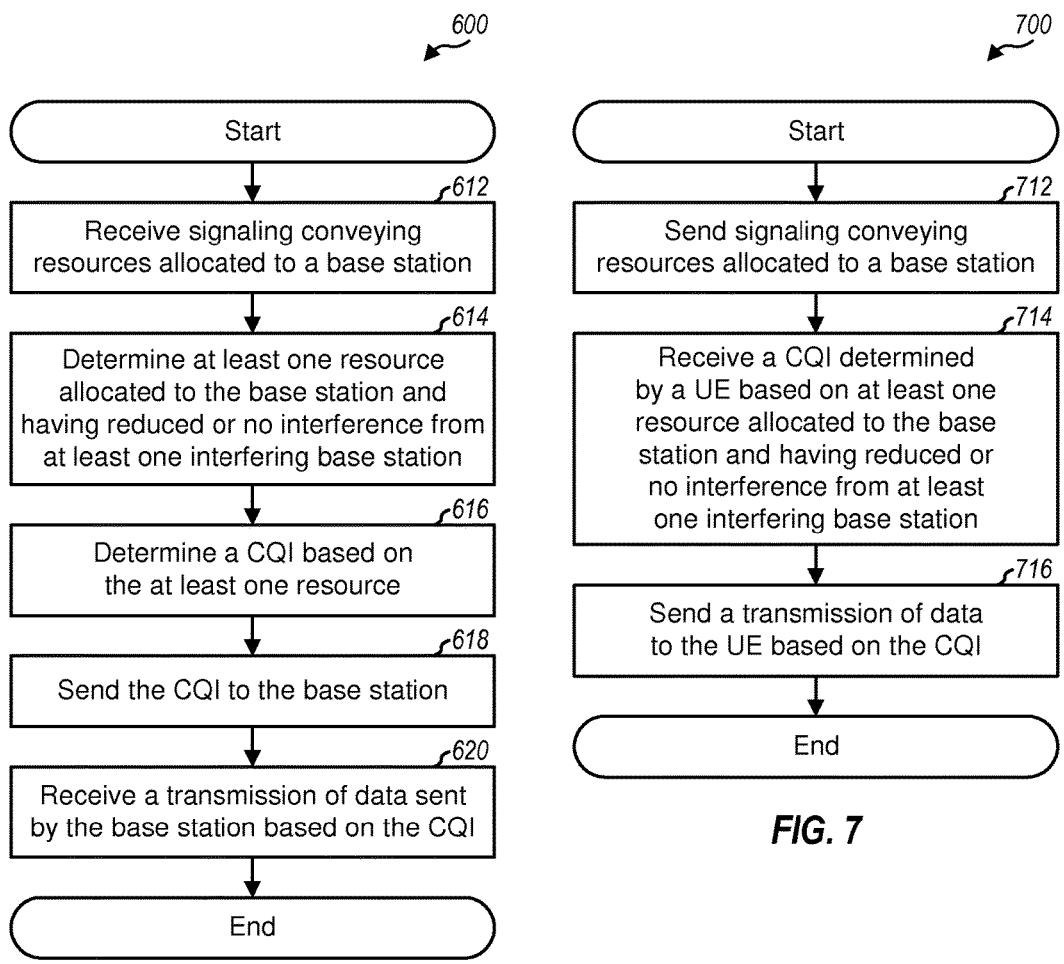
FIG. 6 shows a process for determining a clean CQI for allocated resources.
FIG. 7 shows a process for receiving a clean CQI for allocated resources.

FIG. 6 shows a design of a process 600 for determining a clean CQI. Process 600 may be performed by a UE (as described below) or by some other entity. The UE may receive signaling conveying resources allocated to a base station (block 612). The UE may determine at least one resource allocated to the base station and having reduced or no interference from at least one interfering base station, e.g., based on the received signaling (block 614). The at least one resource may correspond to at least one subframe, or at least one subband, or at least one resource block, or some other type of resource allocated to the base station. The at least one resource may be semi-statically allocated to the base station via resource partitioning for the base station and the at least one interfering base station. The UE may determine a CQI based on the at least one resource (block 616). The UE may determine the CQI by excluding resources allocated to the at least one interfering base station. The UE may send the CQI to the base station (block 618). The UE may thereafter receive a transmission of data (e.g., traffic data and/or control data) sent by the base station based on the CQI (block 620).

FIG. 7 shows a design of a process 700 for receiving a clean CQI. Process 700 may be performed by a base station/eNB (as described below) or by some other entity. The base station may send signaling conveying resources allocated to the base station (block 712). The base station may receive a CQI determined by a UE based on at least one resource allocated to the base station and having reduced or no interference from at least one interfering base station (block 714). The base station may send a transmission of data to the UE based on the CQI (block 716).

Figures 8, 9:
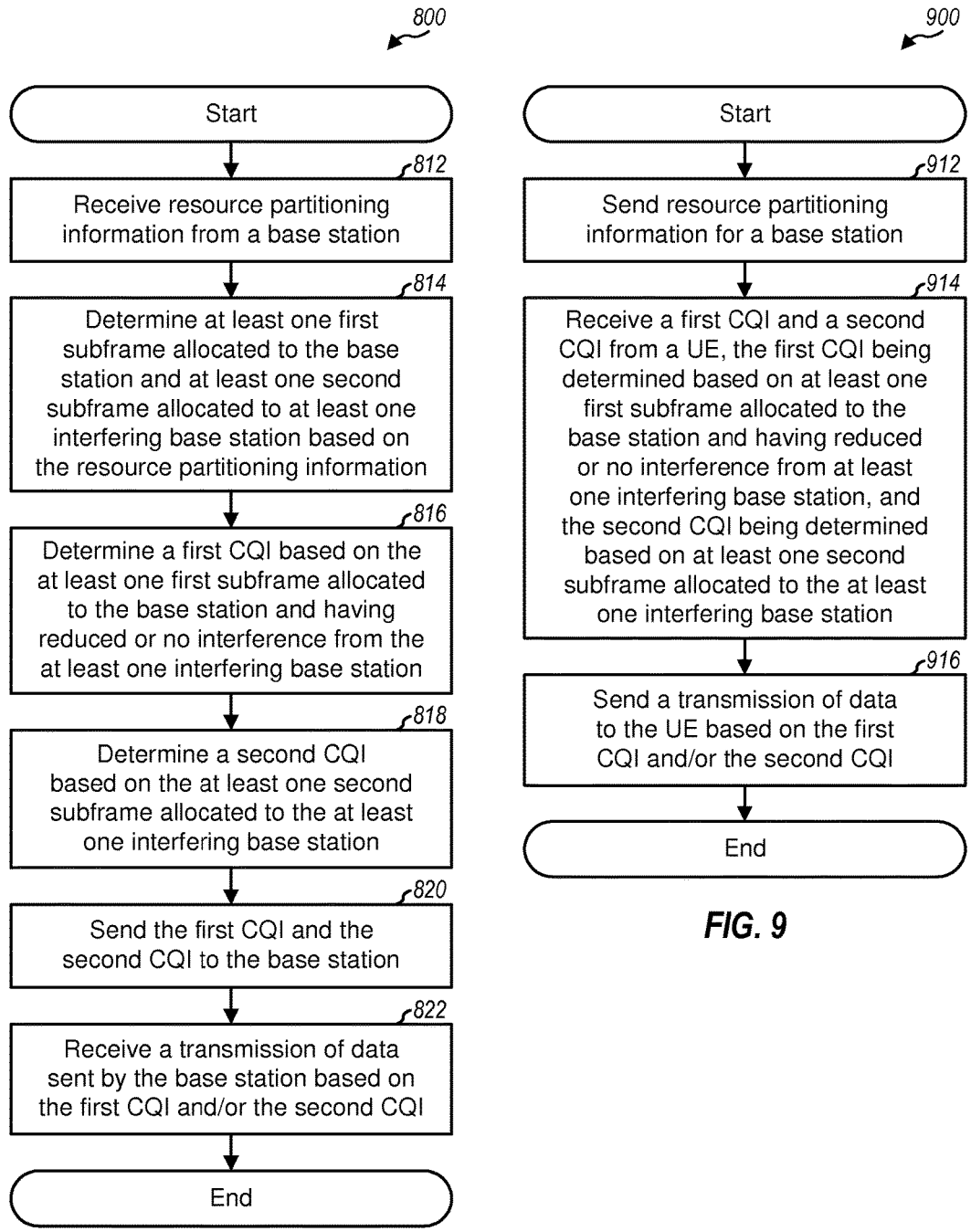
FIG. 8 shows a process for determining multiple CQIs for different resources.
FIG. 9 shows a process for receiving multiple CQIs for different resources.

FIG. 8 shows a design of a process 800 for determining multiple CQIs for different resources. Process 800 may be performed by a UE (as described below) or by some other entity. The UE may receive resource partitioning information from a base station (block 812). The resource partitioning information may convey subframes semi-statically allocated to the base station (e.g., U subframes) and subframes semi-statically allocated to at least one interfering base station (e.g., N subframes). The UE may determine at least one first subframe allocated to the base station and at least one second subframe allocated to the at least one interfering base station based on the resource partitioning information (block 814).

The UE may determine a first CQI based on the at least one first subframe allocated to the base station and having reduced or no interference from the at least one interfering base station (block 816). The UE may determine a second CQI based on the at least one second subframe allocated to the at least one interfering base station (block 818). The UE may send the first CQI and the second CQI to the base station (block 820). The UE may thereafter receive a transmission of data sent by the base station based on the first CQI and/or the second CQI (block 822).

The UE may determine the second CQI in various manners. In a first design, the UE may determine the second CQI based on only the at least one second subframe allocated to the at least one interfering base station (e.g., only N subframes) and not based on any subframes semi-statically allocated to the base station. In a second design, the UE may determine the second CQI by averaging over a set of subframes including the at least one second subframe. In one design, the set of subframes may exclude subframes semi-statically allocated to the base station (e.g., U subframes). In another design, the set of subframes may exclude subframes semi-statically allocated to the base station (e.g., U subframes) and subframes semi-statically allocated to the at least one interfering base station (e.g., N subframes). The number of subframes in the set of subframes may be a fixed value, or configured by the base station and signaled to the UE, or determined based on resource partitioning for the base station and the at least one interfering base station, or ascertained in other manners.

In a third design, the UE may determine the second CQI based on total interference in the at least one first subframe and the at least one second subframe. The UE may estimate interference in the at least one first subframe (e.g., U subframe) allocated to the base station. The UE may also estimate interference in the at least one second subframe (e.g., N subframe) allocated to the at least one interfering base station. The UE may estimate the total interference based on the estimated interference in the at least one first subframe and the estimated interference in the at least one second subframe. The UE may then determine the second CQI based on the estimated total interference.

In a fourth design, the UE may determine the at least one second subframe based on an offset with respect to a subframe in which the second CQI is reported (or a subframe used to determine the first CQI). In one design, the UE may receive signaling conveying the offset from the base station. In another design, the UE may determine the offset by cycling through a set of offsets and selecting different subframes for determining the second CQI in different periods. The UE may receive signaling conveying the set of offsets and/or the number of offsets from the base station.

The UE may also determine the second CQI based on at least one subframe determined in other manners. The UE may also determine at least one additional CQI based on at least one additional subframe.

The UE may report the first and second CQIs in various manners. In one design, the UE may report the first and second CQIs at the same periodicity, e.g., in the same subframe or different subframes. In another design, the UE may report the first CQI at a first periodicity and may report the second CQI at a second periodicity different from (e.g., less frequent than) the first periodicity. In one design, the UE may report the first CQI based on a first CQI configuration and may report the second CQI based on a second CQI configuration different from the first CQI configuration. Each CQI configuration may be associated with various parameters for reporting CQI such as the periodicity of reporting CQI, which subframes to send CQI, etc.

FIG. 9 shows a design of a process 900 for receiving multiple CQIs for different resources. Process 900 may be performed by a base station/eNB (as described below) or by some other entity. The base station may send (e.g., broadcast) resource partitioning information conveying subframes allocated to the base station and subframes allocated to at least one interfering base station (block 912). The base station may receive a first CQI and a second CQI from a UE (block 914). The first CQI may be determined based on at least one first subframe allocated to the base station and having reduced or no interference from the at least one interfering base station. The second CQI may be determined based on at least one second subframe allocated to the at least one interfering base station. The second CQI may be determined by the UE in various manners, e.g., as described above. The base station may send a transmission of data to the UE based on the first CQI and/or the second CQI (block 916).

Figure 10:
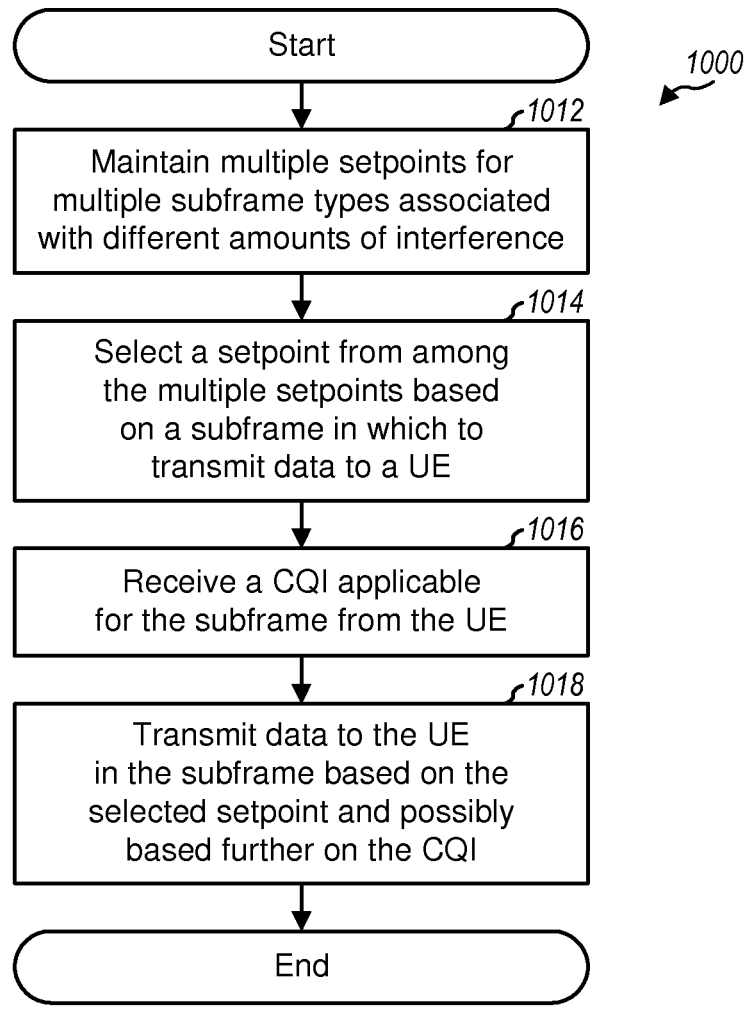
FIG. 10 shows a process for transmitting data.

FIG. 10 shows a design of a process 1000 for transmitting data. Process 1000 may be performed by a base station/eNB (as described below) or by some other entity. The base station may maintain multiple setpoints for multiple subframe types associated with different levels of interference (block 1012). The base station may select a setpoint from among the multiple setpoints based on a subframe in which to transmit data to a UE (block 1014). The base station may receive a CQI applicable for the subframe from the UE (block 1016). The base station may transmit data to the UE in the subframe based on the selected setpoint and possibly based further on the CQI (block 1018). The base station may transmit the data on the PDCCH, the PHICH, the PDSCH, or some other physical channel.

In one design of block 1012, the base station may determine the setpoint for each subframe type based on one or more metrics such as an estimated interference for subframes of the subframe type, a target level of performance, a target error rate, a HARQ target termination, some other metric, or a combination thereof.

In one design, the base station may maintain the multiple setpoints for the multiple subframe types for the UE. The base station may maintain a plurality of sets of setpoints for a plurality of UEs, one set of setpoints for each UE. In another design, the base station may maintain the multiple setpoints for the multiple subframe types for a particular physical channel. The base station may maintain a plurality of sets of setpoints for a plurality of physical channels, one set of setpoints for each physical channel. In yet another design, the base station may maintain the multiple setpoints for the multiple subframe types for a particular physical channel for the UE. The base station may also maintain the multiple setpoints for the multiple subframe types in other manners.

In one design, the base station may determine a transmit power level based on the selected setpoint and the CQI. The base station may transmit data to the UE based on the determined transmit power level. In another design, the base station may determine an amount of resources (e.g., the number of CCEs or resource blocks) to use to transmit data to the UE based on the selected setpoint and the CQI. The base station may transmit data to the UE based on the determined amount of resources. The base station may also determine other parameters for data transmission based on the setpoint and the CQI.

Figure 11:
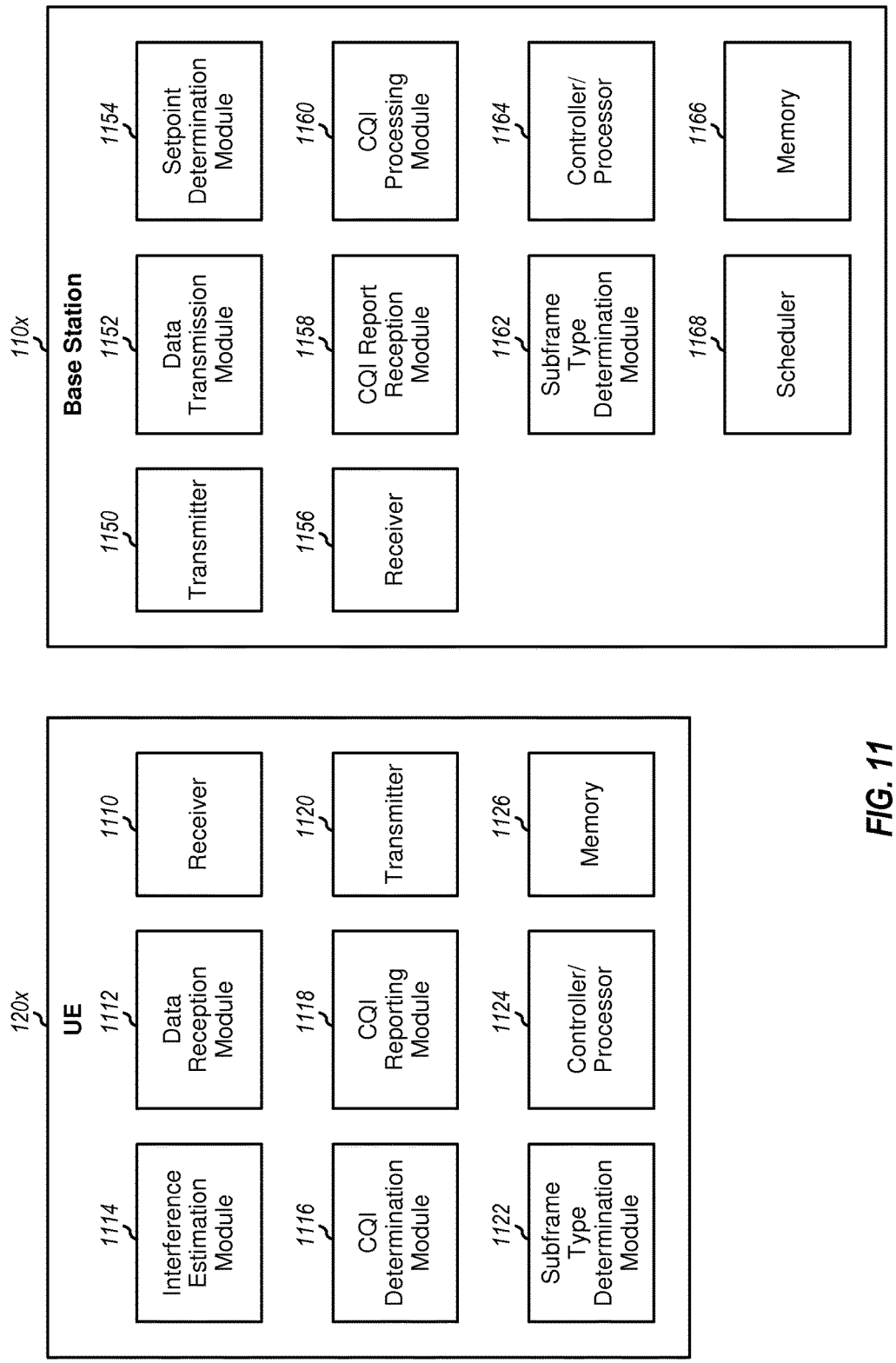
FIG. 11 shows a block diagram of a design of a base station and a UE.

FIG. 11 shows a block diagram of a design of a base station/eNBs 110x and a UE 120x, which may be one of the base stations/eNBs and one of the UEs in FIG. 1. Within UE 120x, a receiver 1110 may receive and process downlink signals from base station 110x and other base stations. A module 1112 may process (e.g., demodulate and decode) received data transmissions. A module 1114 may estimate interference in subframes of different types. A module 1116 may determine clean CQI and unclean CQI based on the estimated interference for subframes of different types, as described above. A module 1118 may generate and send CQI reports as configured for UE 120x. A module 1122 may receive signaling (e.g., SRPI) indicative of subframes allocated to base station 110x and may determine subframes of different types. The various modules within UE 120x may operate as described above. A controller/processor 1124 may direct the operation of various modules within UE 120x. A memory 1126 may store data and program codes for UE 120x.

Within base station 110x, a module 1152 may generate data transmissions for UE 120x and/or other UEs. A module 1154 may determine the transmit power level to use for each data transmission based on a setpoint applicable for that data transmission. A transmitter 1154 may generate downlink signals comprising the data transmissions and may transmit the downlink signals to UE 120x and other UEs. A receiver 1156 may receive and process uplink signals transmitted by UE 120x and other UEs. A module 1158 may process a received signal to recover CQI reports sent by UE 120x. A module 1160 may obtain clean CQI and unclean CQI from the CQI reports sent by UE 120x and may select a modulation and coding scheme for each data transmission to UE 120x based on an applicable CQI and/or other information. A module 1162 may determine subframes allocated to base station 110x and may generate resource partitioning information (e.g., SRPI) indicative of subframes of different types for base station 110x. The various modules within base station 110x may operate as described above. A controller/processor 1164 may direct the operation of various modules within base station 110x. A memory 1166 may store data and program codes for base station 110x. A scheduler 1168 may schedule UEs for data transmissions.

The modules in FIG. 11 may comprise processors, electronic devices, hardware devices, electronic components, logical circuits, memories, software codes, firmware codes, etc., or any combination thereof.

Figure 12:
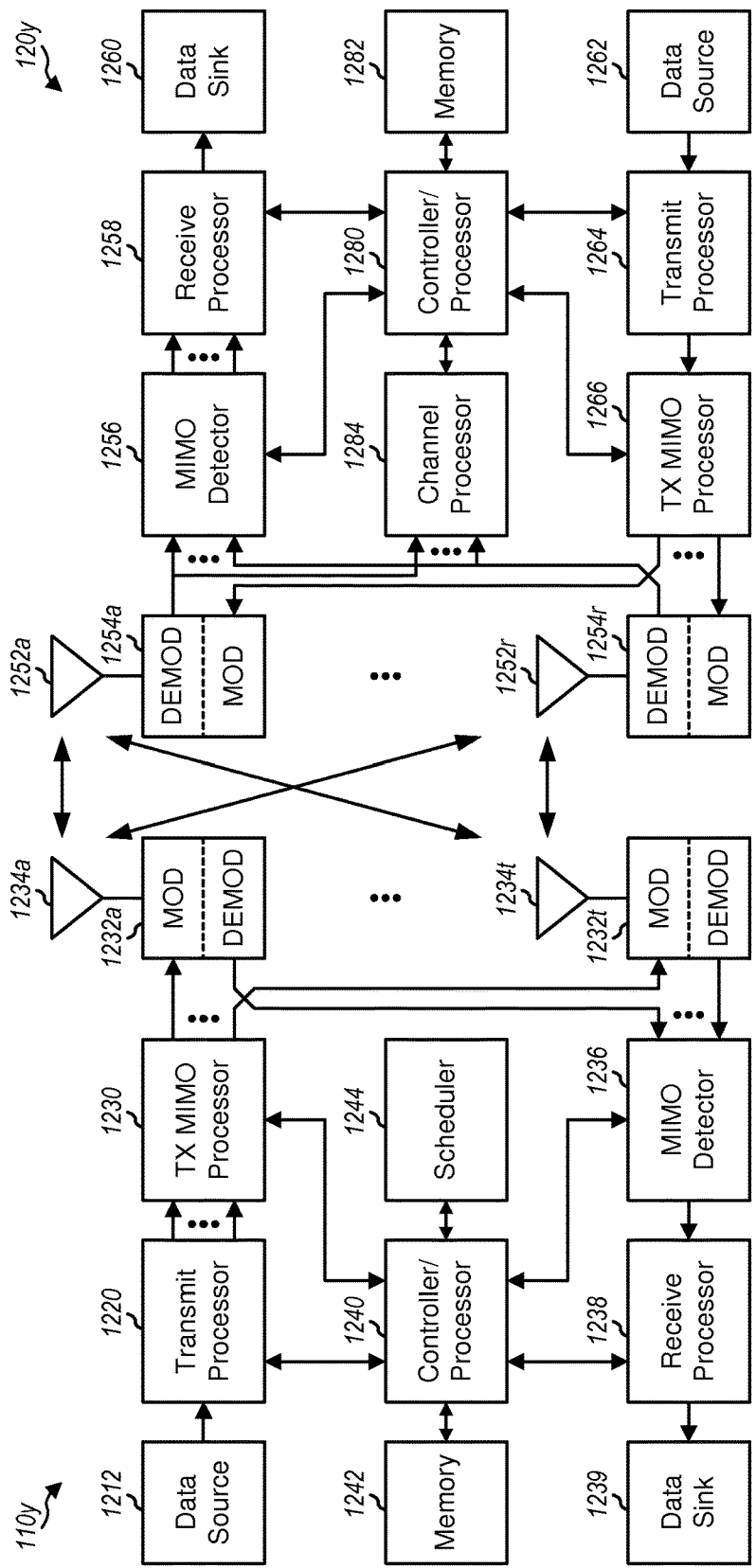
FIG. 12 shows a block diagram of another design of a base station and a UE.

FIG. 12 shows a block diagram of a design of a base station/eNB 110y and a UE 120y, which may be one of the base stations/eNBs and one of the UEs in FIG. 1. Base station 110y may be equipped with T antennas 1234a through 1234t, and UE 120y may be equipped with R antennas 1252a through 1252r, where in general T≥1 and R≥1.

At base station 110y, a transmit processor 1220 may receive traffic data from a data source 1212 for one or more UEs, select one or more modulation and coding schemes (MCS) for each UE based on CQIs received from that UE, process (e.g., encode and modulate) the traffic data for each UE based on the MCS(s) selected for the UE, and provide data symbols for all UEs. Transmit processor 1220 may also process system information (e.g., SRPI, etc.) and control data/information (e.g., for offsets, grants, upper layer signaling, etc.) and provide overhead symbols and control symbols. Processor 1220 may also generate reference symbols for reference signals (e.g., the CRS) and synchronization signals (e.g., the PSS and SSS). A transmit (TX) multiple-input multiple-output (MIMO) processor 1230 may perform spatial processing (e.g., precoding) on the data symbols, the control symbols, the overhead symbols, and/or the reference symbols, if applicable, and may provide T output symbol streams to T modulators (MODS) 1232a through 1232t. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink signal. T downlink signals from modulators 1232a through 1232t may be transmitted via T antennas 1234a through 1234t, respectively.

At UE 120y, antennas 1252a through 1252r may receive the downlink signals from base station 110y and/or other base stations and may provide received signals to demodulators (DEMODs) 1254a through 1254r, respectively. Each demodulator 1254 may condition (e.g., filter, amplify, downconvert, and digitize) its received signal to obtain input samples. Each demodulator 1254 may further process the input samples (e.g., for OFDM, etc.) to obtain received symbols. A MIMO detector 1256 may obtain received symbols from all R demodulators 1254a through 1254r, perform MIMO detection on the received symbols if applicable, and provide detected symbols. A receive processor 1258 may process (e.g., demodulate and decode) the detected symbols, provide decoded traffic data for UE 120y to a data sink 1260, and provide decoded control data and system information to a controller/processor 1280. A channel processor 1284 may estimate interference in subframes of different types and determine clean and unclean CQIs based on the estimated interference, as described above.

On the uplink, at UE 120y, a transmit processor 1264 may receive and process traffic data from a data source 1262 and control data (e.g., for CQI reports) from controller/processor 1280. Processor 1264 may also generate reference symbols for one or more reference signals. The symbols from transmit processor 1264 may be precoded by a TX MIMO processor 1266 if applicable, further processed by modulators 1254a through 1254r (e.g., for SC-FDM, OFDM, etc.), and transmitted to base station 110y. At base station 110y, the uplink signals from UE 120y and other UEs may be received by antennas 1234, processed by demodulators 1232, detected by a MIMO detector 1236 if applicable, and further processed by a receive processor 1238 to obtain decoded traffic data and control data sent by UE 120y. Processor 1238 may provide the decoded traffic data to a data sink 1239 and the decoded control data to controller/processor 1240.

Controllers/processors 1240 and 1280 may direct the operation at base station 110y and UE 120y, respectively. Processor 1280 and/or other processors and modules at UE 120y may perform or direct process 600 in FIG. 6, process 800 in FIG. 8, and/or other processes for the techniques described herein. Processor 1240 and/or other processors and modules at base station 110y may perform or direct process 700 in FIG. 7, process 900 in FIG. 9, process 1000 in FIG. 10, and/or other processes for the techniques described herein. Memories 1242 and 1282 may store data and program codes for base station 110y and UE 120y, respectively. A scheduler 1244 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
  receiving upper layer signaling identifying a first set of subframes and a second set of subframes;
  determining a first channel quality indicator (CQI) based on at least one first subframe allocated to a serving base station and having reduced or no interference from at least one interfering base station, wherein the first set of subframes includes the first subframe; and
  determining a second CQI based on at least one second subframe allocated to the at least one interfering base station, wherein the second set of subframes includes the second subframe.

2. The method of claim 1, further comprising:
  sending the first CQI and the second CQI to the serving base station; and
  receiving a transmission of data sent by the serving base station based on the first CQI, or the second CQI, or both.

3. The method of claim 1, further comprising:
  receiving resource partitioning information from the serving base station; and
  determining the at least one first subframe allocated to the serving base station and the at least one second subframe allocated to the at least one interfering base station based on the resource partitioning information.

4. The method of claim 1, wherein the determining the second CQI comprises determining the second CQI based on only the at least one second subframe allocated to the at least one interfering base station.

5. The method of claim 1, wherein the determining the second CQI comprises determining the second CQI by averaging over the second set of subframes.

6. The method of claim 5, wherein the second set of subframes excludes subframes semi-statically allocated to the serving base station.

7. The method of claim 5, wherein the second set of subframes excludes subframes semi-statically allocated to the serving base station and subframes semi-statically allocated to the at least one interfering base station.

8. The method of claim 5, wherein the number of subframes in the second set of subframes is a fixed value, or is configured by the serving base station and signaled to the UE, or is determined based on resource partitioning for the serving base station and the at least one interfering base station.

9. The method of claim 1, wherein the determining the second CQI comprises:
  estimating interference in the at least one first subframe allocated to the serving base station,
  estimating interference in the at least one second subframe allocated to the at least one interfering base station,
  estimating total interference based on the estimated interference in the at least one first subframe and the estimated interference in the at least one second subframe, and
  determining the second CQI based on the estimated total interference.

10. The method of claim 1, further comprising:
  determining the at least one second subframe based on an offset with respect to a subframe in which the second CQI is reported.

11. The method of claim 10, further comprising:
  receiving signaling conveying the offset from the serving base station.

12. The method of claim 10, further comprising:
  determining the offset by cycling through a set of offsets and selecting different subframes for determining the second CQI in different periods.

13. The method of claim 12, further comprising:
  receiving signaling conveying the set of offsets, or the number of offsets, or both from the serving base station.

14. The method of claim 1, further comprising:
  determining at least one additional CQI based on at least one additional subframe.

15. The method of claim 1, further comprising:
  reporting the first CQI based on a first CQI configuration; and
  reporting the second CQI based on a second CQI configuration different from the first CQI configuration.

16. The method of claim 1, further comprising:
  reporting the first CQI at a first periodicity; and
  reporting the second CQI at a second periodicity different from the first periodicity.

17. An apparatus for wireless communication, comprising:
- means for receiving upper layer signaling identifying a first set of subframes and a second set of subframes;
- means for determining a first channel quality indicator (CQI) based on at least one first subframe allocated to a serving base station and having reduced or no interference from at least one interfering base station, wherein the first set of subframes includes the first subframe; and
- means for determining a second CQI based on at least one second subframe allocated to the at least one interfering base station, wherein the second set of subframes includes the second subframe.

18. The apparatus of claim 17, further comprising:
- means for receiving resource partitioning information from the serving base station; and
- means for determining the at least one first subframe allocated to the serving base station and the at least one second subframe allocated to the at least one interfering base station based on the resource partitioning information.

19. The apparatus of claim 17, wherein the means for determining the second CQI comprises means for determining the second CQI by averaging over the second set of subframes.

20. The apparatus of claim 17, further comprising:
- means for determining the at least one second subframe based on an offset with respect to a subframe in which the second CQI is reported.

21. The apparatus of claim 17, further comprising:
- means for reporting the first CQI based on a first CQI configuration; and
- means for reporting the second CQI based on a second CQI configuration different from the first CQI configuration.

22. An apparatus for wireless communication, comprising:
- memory;
- at least one processor coupled to the memory and configured to:
  - receive upper layer signaling identifying a first set of subframes and a second set of subframes,
  - determine a first channel quality indicator (CQI) based on at least one first subframe allocated to a serving base station and having reduced or no interference from at least one interfering base station, wherein the first set of subframes includes the first subframe, and
  - determine a second CQI based on at least one second subframe allocated to the at least one interfering base station, wherein the second set of subframes includes the second subframe.

23. The apparatus of claim 22, wherein the at least one processor is configured to receive resource partitioning information from the serving base station, and to determine the at least one first subframe allocated to the serving base station and the at least one second subframe allocated to the at least one interfering base station based on the resource partitioning information.

24. The apparatus of claim 22, wherein the at least one processor is configured to determine the second CQI by averaging over the second set of subframes.

25. The apparatus of claim 22, wherein the at least one processor is configured to determine the at least one second subframe based on an offset with respect to a subframe in which the second CQI is reported.

26. The apparatus of claim 22, wherein the at least one processor is configured to report the first CQI based on a first CQI configuration, and to report the second CQI based on a second CQI configuration different from the first CQI configuration.

27. A non-transitory computer-readable medium comprising:
- code for causing at least one processor to receive upper layer signaling identifying a first set of subframes and a second set of subframes,
- code for causing the at least one processor to determine a first channel quality indicator (CQI) based on at least one first subframe allocated to a serving base station and having reduced or no interference from at least one interfering base station, wherein the first set of subframes includes the first subframe; and
- code for causing the at least one processor to determine a second CQI based on at least one second subframe allocated to the at least one interfering base station, wherein the second set of subframes includes the second subframe.

28. A method for wireless communication, comprising:
- sending to a user equipment (UE) upper layer signaling identifying a first set of subframes and a second set of subframes,
- receiving a first channel quality indicator (CQI) and a second CQI from the UE, the first CQI being determined based on at least one first subframe allocated to a serving base station and having reduced or no interference from at least one interfering base station, and the second CQI being determined based on at least one second subframe allocated to the at least one interfering base station, wherein the first set of subframes includes the first subframe and the second set of subframes includes the second subframe; and
- sending a transmission of data to the UE based on the first CQI, or the second CQI, or both.

29. The method of claim 28, further comprising:
- sending resource partitioning information conveying subframes allocated to the serving base station and subframes allocated to the at least one interfering base station.

30. The method of claim 28, wherein the second CQI is determined by the UE based on only the at least one second subframe allocated to the at least one interfering base station.

31. The method of claim 28, wherein the second CQI is determined by the UE by averaging over the second set of subframes, the second set of subframes excluding subframes semi-statically allocated to the serving base station, or subframes semi-statically allocated to the at least one interfering base station, or both.

32. The method of claim 28, wherein the second CQI is determined by the UE by estimating interference in the at least one first subframe allocated to the serving base station and estimating interference in the at least one second subframe allocated to the at least one interfering base station.

33. The method of claim 28, wherein the at least one second subframe is determined based on an offset with respect to a subframe in which the second CQI is reported.

34. The method of claim 33, further comprising: sending signaling conveying the offset.

35. An apparatus for wireless communication, comprising:
- means for sending to a user equipment (UE) upper layer signaling identifying a first set of subframes and a second set of subframes;

means for receiving a first channel quality indicator (CQI) and a second CQI from the UE, the first CQI being determined based on at least one first subframe allocated to a serving base station and having reduced or no interference from at least one interfering base station, and the second CQI being determined based on at least one second subframe allocated to the at least one interfering base station, wherein the first set of subframes includes the first subframe and the second set of subframes includes the second subframe; and means for sending a transmission of data to the UE based on the first CQI, or the second CQI, or both.

36. The apparatus of claim 35, further comprising:

means for sending resource partitioning information conveying subframes allocated to the serving base station and subframes allocated to the at least one interfering base station.

37. The apparatus of claim 35, wherein the at least one second subframe is determined based on an offset with respect to a subframe in which the second CQI is reported.

38. An apparatus for wireless communication, comprising:

memory; and at least one processor coupled to the memory and configured to:

send to a user equipment (UE) upper layer signaling identifying a first set of subframes and a second set of subframes;

receive a first channel quality indicator (CQI) and a second CQI from the UE, the first CQI being determined based on at least one first subframe allocated to a serving base station and having reduced or no interference from at least one interfering base station, and the second CQI being determined based on at least one second subframe allocated to the at least one interfering base station, wherein the first set of subframes includes the first subframe and the second set of subframes includes the second subframe, and send a transmission of data to the UE based on the first CQI, or the second CQI, or both.

39. The apparatus of claim 38, wherein the at least one processor is configured to send resource partitioning information conveying subframes allocated to the serving base station and subframes allocated to the at least one interfering base station.

40. The apparatus of claim 38, wherein the at least one second subframe is determined based on an offset with respect to a subframe in which the second CQI is reported.

41. A non-transitory computer-readable medium comprising:

code for sending to a user equipment (UE) upper layer signaling identifying a first set of subframes and a second set of subframes;

code for causing at least one processor to receive a first channel quality indicator (CQI) and a second CQI from the UE, the first CQI being determined based on at least one first subframe allocated to a serving base station and having reduced or no interference from at least one interfering base station, and the second CQI being determined based on at least one second subframe allocated to the at least one interfering base station, wherein the first set of subframes includes the first subframe and the second set of subframes includes the second subframe; and code for causing the at least one processor to send a transmission of data to the UE based on the first CQI, or the second CQI, or both.

* * * * *